United States Patent
Sussman

(10) Patent No.: US 6,836,765 B1
(45) Date of Patent: Dec. 28, 2004

(54) SYSTEM AND METHOD FOR SECURE AND ADDRESS VERIFIABLE ELECTRONIC COMMERCE TRANSACTIONS

(76) Inventor: Lester Sussman, 9213 Bulls Run Pkwy., Bethesda, MD (US) 20817

(*) Notice: Subject to any disclaimer, the term of this patent is extended or adjusted under 35 U.S.C. 154(b) by 571 days.

(21) Appl. No.: 09/649,684

(22) Filed: Aug. 30, 2000

(51) Int. Cl.[7] .............................................. G06F 17/60
(52) U.S. Cl. ..................... 705/75; 709/245; 709/203; 713/156; 713/162; 713/168; 713/182; 713/201
(58) Field of Search ..................... 705/75; 709/200–203, 709/245; 713/150, 155, 156, 162, 168, 182, 200, 201

(56) References Cited

U.S. PATENT DOCUMENTS

| | | | | |
|---|---|---|---|---|
| 5,790,677 A | * | 8/1998 | Fox et al. | 380/24 |
| 6,151,628 A | * | 11/2000 | Xu et al. | 709/225 |
| 6,466,571 B1 | * | 10/2002 | Dynarski et al. | 370/352 |
| 6,487,196 B1 | * | 11/2002 | Verthein et al. | 370/352 |

FOREIGN PATENT DOCUMENTS

WO     WO 97/14234    *   4/1997

OTHER PUBLICATIONS

MultiTech Systems, "RASExpress Radius Server User Guide", Dec. 3, 1999, revision A.*

* cited by examiner

Primary Examiner—James P. Trammell
Assistant Examiner—Jalatee Worjloh

(57) ABSTRACT

An electronic commerce system, that electronically emulates the Mail Order/Telephone Ordering process on the Internet, including customer and merchant network address verification. Customer and merchant address verification are done electronically. Other commerce parties than the customer and merchant in the electronic commerce system, could be as easily verified using the commerce system. (PKI) The system uses a Public Key Infrastructure system to ensure secure and irrefutable electronic commerce transactions on the Internet. PKI ensures that the electronic commerce party is whom he claims to be when used in conjunction with network address verification, ensures confidentiality of the data transmitted between the commerce parties and ensures that the data has not been altered during transmission. The electronic commerce system operates in two phases: a registration phase and a transaction phase. During the registration phase each participant registers with the relevant parties in the commerce system and then registers with a central trusted authority on the Internet. The registration phase includes parties registering with their relevant banks and Internet Service Providers. The banks and ISPs transmit a digitally signed certificate with pertinent information to the registrant. The participant's Internet Service Provider's certificate contains encrypted information identifying how the participant logs onto the Internet and where the participant resides on the Internet when conducting a commerce transaction. During the transaction phase of the commerce system, these registered digital certificates are used to verify the credentials of the various participants and the appropriate public keys are used to encrypt information on a "for-your-eyes-only" basis, such that only the party that needs to view the information will be able to decrypt it using their private key.

18 Claims, 4 Drawing Sheets

REGISTRATION PROCESS

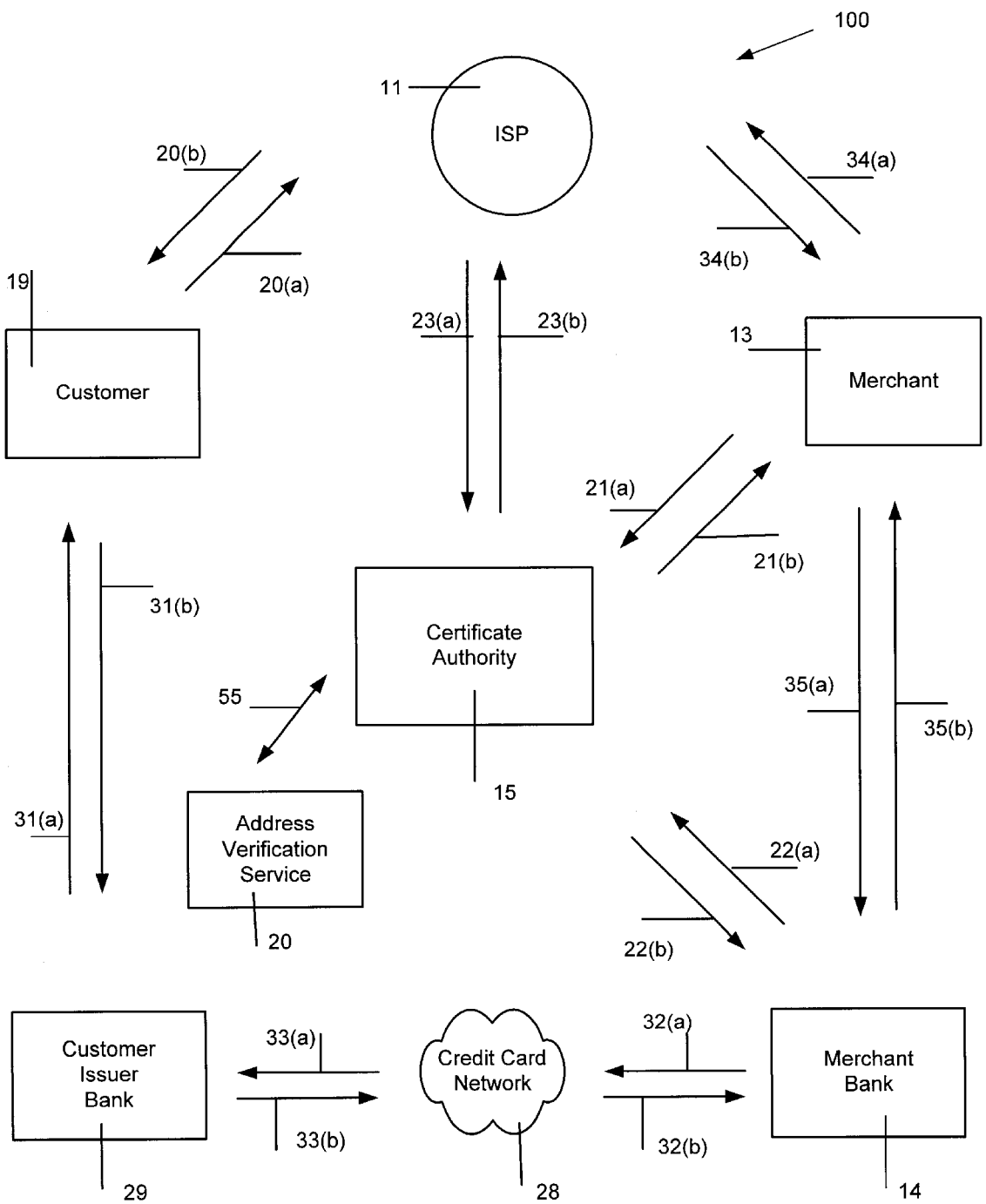
TRANSACTION PROCESS  Fig. 4

SYSTEM AND METHOD FOR SECURE AND ADDRESS VERIFIABLE ELECTRONIC COMMERCE TRANSACTIONS

BACKGROUND

According to Forrester Research, the number of US households purchasing on the Internet (a.k.a. the Net) was 10 million in 1998. IDC estimated that this constituted sales of $14.9 billion. Forecasts for 1999 were 13 million households purchasing $31 billion of goods on the Net. These figures were made available in the "State of the Internet: USIC's Report on Use & Threats in 1999" (http://www.usic.org/currentsite/usic_state_of_net99.htm).

Currently credit card purchases are the primary means of consumer electronic commerce on the Internet. As the popularity of the Net rises for electronic commerce so does credit card fraud.

Criminals use various methods to illegally acquire consumers' credit-card numbers. In December 1999 the online music retailer CDUniverse was hacked and thousands of its customers' credit-card numbers were published on the Net. Other web sites that were compromised include the wireless phone retailer Promobility.com and the electronic commerce portal Salesgate.com. (source: Forbes, May 22, 2000)

Another form of Net commerce fraud is via fake web sites that clone legitimate web sites. The fraudulent, i.e. dummy web site assumes the identity of the valid web site. An example of a credit-card fraud that used a cloned web site on the Net, is the e-mail billing scam. In September 1999 the web site of Value Net Internetwork Services was cloned. The perpetrator sent e-mails to dozens of consumers requesting that they visit the site to verify their credit-card information. Embedded in the e-mail was a link to a phony site (source: Forbes, May 22, 2000). Thus consumers unwittingly gave away their credit card numbers and other pertinent information (e.g. billing address) to thieves.

Protection against credit fraud has been legislated by the US Federal government in that the consumer is only liable for $50 of the fraudulent purchases. The rest of the cost is borne by the credit card company.

Outside of the Internet, credit-card transactions are primarily done via Mail Order/Telephone Ordering (MOTO). This obviously excludes "face-to-face" transactions executed in the merchant's place of business. MOTO works whereby the customer calls the merchant, orders products and gives a credit-card number to the merchant over the phone. The merchant then contacts credit-card transaction authorizer to process the transaction. All that is checked in this customer-not-present (CNP) transaction is Address Verification Service (AVS). Other credit-card fraud prevention measures such as anti-tamper proof tape, holograms, etc. are obviously of no use in a CNP transaction. MOTO AVS simply compares a portion of the billing address that the customer gives the merchant on request with the records held by the card issuer. The limitations of AVS include the following:

AVS only works for billing addresses in the USA and the Internet is a global consumer network.
  Thieves can supply a valid billing address, but then request a different shipping address.

Banks and credit-card issuers (e.g. American Express, MasterCard, Visa) are trying to solve this problem by encouraging the adoption of a new system called Secure Electronic Transaction SET (U.S. Pat. No. 5,790,677). On Aug. 4, 1998 the '677 patent was granted to Fox et. al. and assigned to Microsoft Corporation. It is a good invention that uses digital certificates to validate all parties involved in the electronic transaction and encrypts credit card information and other financial data prior to transmission on a network.

To date, SET has not been adopted to any critical mass either by merchants or customers. A list of merchants that have adopted the SET protocol can be seen on the Net via links from the SET organization's web site, e.g. for Visa SET merchants at http://www.visa.com/nt/ecomm/shopping/set_merchants.html and MasterCard SET merchants at http://www.mastercard.com/shoponline/set/bycountry.html. As can be seen from these merchant lists, most of the SET registered merchants are based in Europe and currently the total number is less than 1000. No indication is given as to how many customers use SET, although given the age tested economic principles of supply and demand, the fact that the number of merchants using SET is relatively low, it is a fair indication that too few consumers use SET. On these listed web sites it can be seen that very few US merchants are SET enabled. Today the US merchants on the Internet prefer to use Secure Sockets Layer (SSL). SSL only guarantees that data is safely (i.e. encrypted) transmitted between the customer and the merchant. It does not guarantee that the data will be electronically stored and handled safely by the merchant. Furthermore financial information that the merchant does not need to see is visible. An example of information that the merchant does not need to see is the customer's credit card number. Practically all that the merchant needs to be concerned with is that he will be paid for the merchandise that he is selling to the customer and the customer's shipping address. This visibility of financial information could lead to abuse. SSL does not deal with validating the identities of the various transaction parties.

Currently the US leads the world with the number of customers accessing the Net. The US has over 100 million PC users accessing the Internet, Western Europe has fewer than 100 million users and Asia-Pacific has fever than 50 million users (source: Business Week, May 29, 2000: Special Report "Wireless in Cyberspace").

There are other online commerce payment schemes, but to date one of these methods have achieved critical mass in usage by consumers. One example of an alternate online payment method is micro-cash, a.k.a. micropayments, and a.k.a. cybercash. U.S. Pat. No. 6,061,665 issued to Bahreman on May 9, 2000 and U.S. Pat. No. 5,815,657 issued to Williams, et al. on Sep. 29, 1998 are two examples of many of this technology. A number of problems are encountered with this method including the fact that currently very few merchants have adopted this payment method.

Both the SET and cybercash methods of online payment overlook the acceptance and trust of customers and merchants to use new and sophisticated technology. This invention proposes a method and means that builds on existing technology and payment methodologies that customers and merchants are comfortable with.

Another method has been proposed to secure CNP credit-card transactions by using personal identification numbers (PINs). An article in Inter@active Week trade journal on May 1, 2000, titled "The Answer To Credit-Card Security?" discusses this proposal. The proposed method is similar to the use of a PIN in an automated teller machine (ATM) transaction. As the Inter@active Week article states, the problem with this proposal is that Visa and MasterCard have not shown an interest in this proposal. One other problem is that some customers keep their ATM PIN together with their ATM card. Hence if the customer's wallet is stolen, then the thief has "free" access to the customer's bank account. A similar problem faces the online PIN proposal.

SUMMARY OF THE INVENTION

The invention proposes to emulate the Mail Order/Telephone Ordering (MOTO) process electronically. MOTO consists of the following steps:
1. Purchase—Customer purchases a service or product with a credit card from a merchant.
2. Authorization—Customer's credit card transaction is authorized.
3. Routing—The transaction is routed to the merchant's bank (i.e. acquiring bank).
4. Processing—The merchant's bank processes the transaction using an electronic processing network to notify the customer's credit card company (i.e. issuer).
5. Posting—The customer's credit card company posts the transaction to the customer's account and then pays the merchant's bank (i.e. acquiring bank).
6. Payment—The merchant's acquiring bank credits the merchant's bank account.

The step that the invention focuses on is the Authorization step. In a customer-not-present (CNP) transaction, the customer is asked for a billing address, which is then used to verify the customer via an Address Verification Service (AVS). The current invention always verifies that the customer is who he says he is. This is done electronically and described in the Detailed Description of the Preferred Embodiment. Furthermore, the invention verifies the merchant as well. The preferred embodiment's merchant verification method is similar to the method used by SET, but with the option of using the electronic AVS method proposed in this invention. Other commerce parties could as easily be verified using the proposed AVS of the invention.

A general note regarding the implementation of the electronic commerce described in this invention: all electronic steps are implemented by means of software resident on both the originator's equipment, e.g. the customer premise equipment, as well as on the recipient's equipment, e.g. the merchant's web server.

BRIEF DESCRIPTION OF THE DRAWINGS

FIG. 4 is a schematic of an electronic commerce during a transaction process according to the preferred embodiment of this invention.

DETAILED DESCRIPTION OF THE PREFERRED EMBODIMENT

Various acronyms are used in the description of the invention's preferred embodiment. Table 1 provides a description of these acronyms with reference to FIGS. 1 through 4.

TABLE 1

| Acronym | Description | Definition |
| --- | --- | --- |
| AVS 20 | Address Verification System | Verifies that the commerce participant is located at their claimed location. |
| CA 15 | Certificate Authority | Provider who issues digital certificates to electronic commerce participants verifying their identity. |
| CPE 16 | Customer Premise Equipment | Network communications equipment that is resident at a customer's premises. |
| NAP 10 | Network Access Provider | A service provider who sells network access services. The NAP usually owns or leases the physical links to the customer premise. |
| NAS 17 | Network Access Server | A device that performs various functions such as Radius authentication, network tunneling, etc. |
| NSP 9 | Network Service Provider | A service provider who leases circuits from a NAP and performs network services such as Internet access to customers. |
| PC 3 | Personal Computer | A computer based on the Microsoft, Apple, Linux, etc. operating systems. |
| PDA 4 | Personal Digital Assistant | Hand-held electronic device such as a Palm device. |
| PSTN 7 | Public Switched Telephone Network | The telephone network that connects all telephones together. |
| RADIUS 18 | Remote Authentication Dial-In Service | A public client/server based security protocol that supports Authentication, Authorization and Accounting (AAA). |

Electronic Commerce System

Figure 1:
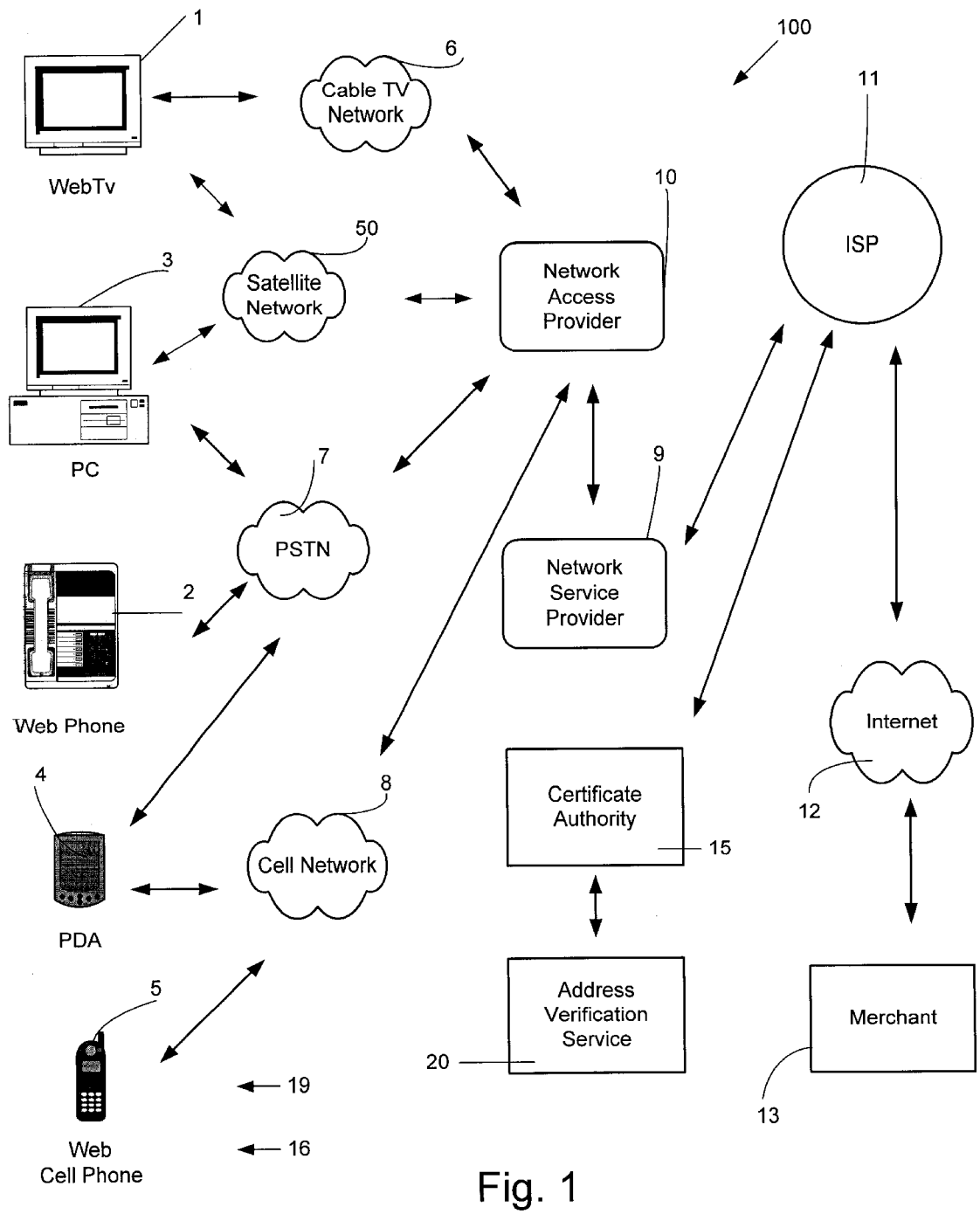
FIG. 1 is a schematic of an electronic commerce system highlighting the various participants according to the preferred embodiment of this invention.
Figure 2:
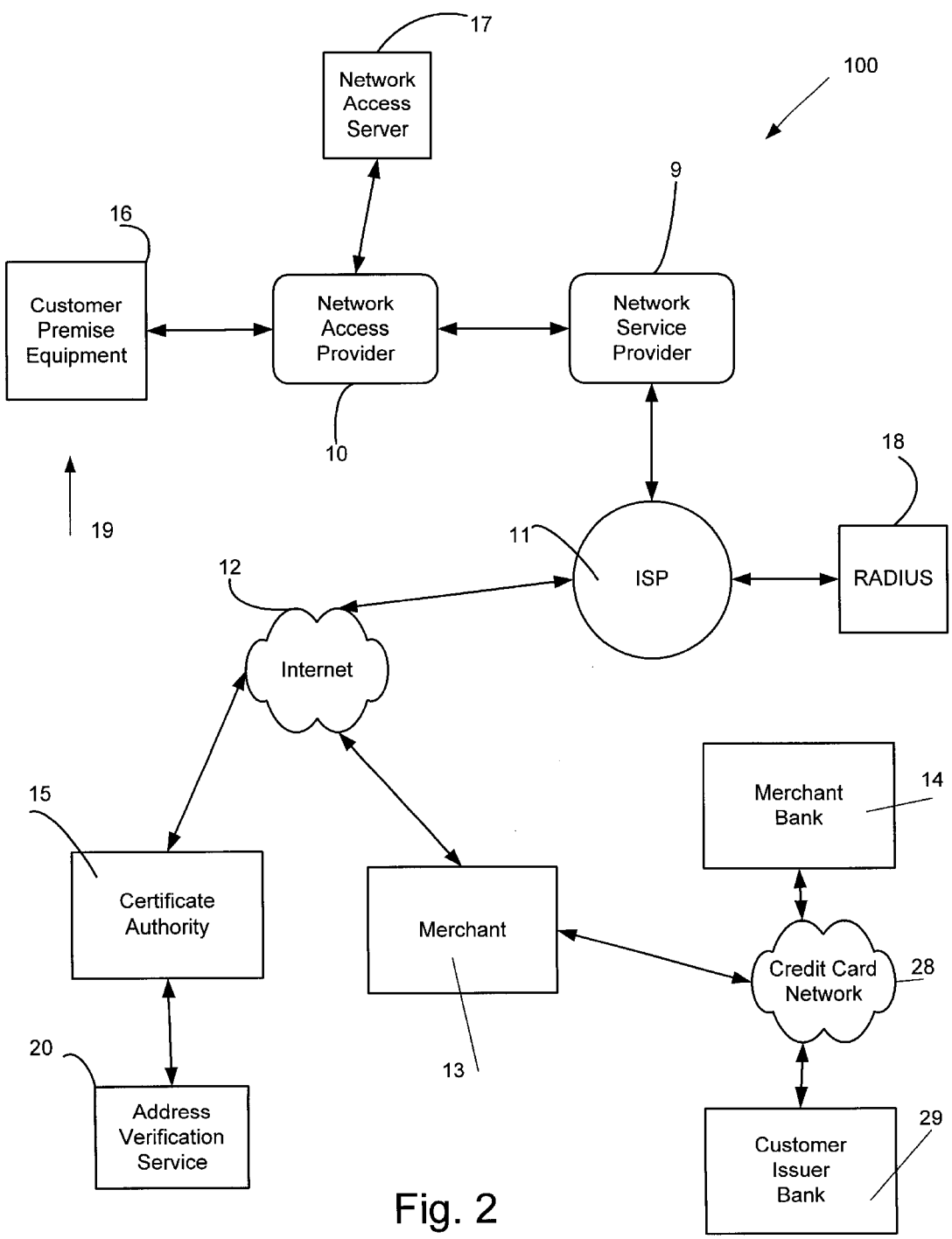
FIG. 2 is a schematic of an electronic commerce system detailing the customer access method to purchase a merchant's wares according to the preferred embodiment of this invention.

FIGS. 1 and 2 illustrate an electronic commerce system 100 for transacting secure and verifiable electronic commerce. The electronic commerce system 100 consists of multiple participants including the customer 19, the merchant 13, the customer's bank 29, the merchant's bank 14 and a trusted party that is represented in the diagrams as the certificate authority 15.

To simplify the description and understanding of the preferred embodiment's electronic commerce system 100, the detailed description builds on the model of the widely used and accepted Mail Order/Telephone Ordering (MOTO) commerce system.

Recapping the description given of the MOTO system as described in the SUMMARY OF THE INVENTION in conjunction with FIGS. 1 and 2, MOTO consists of the following steps;
1. Purchase—Customer 19 purchases a service or product with a credit card from a merchant 13.
2. Authorization—Customer's 19 credit card transaction is authorized.
3. Routing—The transaction is routed to the merchant's bank 14 (i.e. acquiring bank).
4. Processing—The merchant's bank 14 processes the transaction using an electronic processing network 28 to notify the customer's 19 credit card company 29 (i.e. issuer).
5. Posting—The customer's 19 credit card company 29 posts the transaction to the customer's account and then pays the merchant's bank 14 (i.e. acquiring bank).
6. Payment—The merchant's acquiring bank 14 credits the merchant's bank account.

In summary when a customer 19 uses a credit card to purchase a product, the card information is given to the merchant 13 who enters the credit card number and purchase amount into a magnetic card reader that is usually attached to an electronic credit card terminal. The purchase information is usually routed via the PSTN 7 to the card issuer 29. The issuer 29 returns an approval or decline message. After the transaction is authorized it is routed to the merchant's bank 14. The bank 14 submits the transaction to the credit card company's electronic processing network 28 (e.g. Visa, MasterCard, American Express, etc.). The credit card company then routes the transaction to the card issuer 29, i.e. the customer's credit card bank, which posts the transaction to the customer's account and reimburses the acquiring bank 14.

Currently if a credit card was stolen, then the merchant 13 and issuer 29 have no way of knowing that the customer 19 is illegally using the card, except if the true owner of the card reported the theft and the issuer 29 has logged the theft. In a customer-not-present (CNP) transaction, the customer 19 is usually, but not always asked for a billing address, which is then used to verify the customer 19 via Address Verification Service 20 (AVS). Usually in a customer-present transaction, the billing address is not requested and hence Address Verification Service 20 is not used. It is not uncommon for thieves to have the relevant credit card billing address. "Bin diving", purse snatching and mail theft is common practice for thieves to lay their hands on the billing address (source: "When Your Good Name Is Stolen", Washington Post, May 7, 2000).

To those versed in the art, it is obvious that the invention's preferred embodiment could apply to other systems besides commercial transactions. For example, in a democratic society in which citizens' vote for various levels of government, the attributes of confidentiality, verification and data integrity could be used in providing citizens with secure, private, non-reputable, online voting.

Another example of applying the current invention would be in the instance for a business to notify a customer of confidential information. Recently Kaiser Permanente, the largest health insurer in the USA sent sensitive medical information by email to the wrong recipients (source: "Kaiser E-Mail Glitch Highlights Pitfalls Of Placing Personal-Health Data Online", Wall Street Journal, Aug. 11, 2000). Use of the preferred embodiment would prevent unauthorized people from viewing information not intended for them, i.e. the encrypted text would not be decipherable by them because of the use of PKI to encrypt sensitive customer information.

General Operation

FIG. 1 and FIG. 2 illustrate the invention's preferred embodiment of the various parties interacting in an electronic commerce system 100. The customer 19 can use as his customer premise equipment (CPE) 16 devices such as WebTv 1 (e.g. Microsoft's set top interactive cable TV system), a Web Phone 2 (e.g. iPhone from CIDCO), a PC 3 (personal computer), a wireless or wired PDA 4 (personal digital assistant, e.g. the Palm V from Palm Inc.) and a Web Cell Phone 5 (e.g. i-mode from NTT DoCoMo). A note about wireless technologies. In today's art wireless communications is transmitted over radio frequencies (RF), i.e. an RF network between the CPE 16 and another recipient device. The RF network consists of various communications technologies, e.g. TDMA, CDMA, GSM, etc., using WAP, Third Generation (3G), and other wireless Internet protocols.

As technology evolves, other CPE 16 may evolve in the market place. The invention does not exclude the use of these devices from the electronic commerce system 100. One example of such an evolving electronic device is Sony Corporation's PlayStation 2 (source: "Sony Sets Game Plan in Bold Bid for the Web", Wall Street Journal Jun. 2, 2000).

The customer premise equipment 16 each connects to the Net 12 via different networks. WebTv 1 connects via the Cable TV Network 6 using a cable modem, or a Satellite Network 50 using modems as well, e.g. DirectPC from Hughes. The Web Phone 2, the wired PDA 4 and PC 3 usually connect through the PSTN 7 using analog modems or broadband modems such as DSL, but could as easily connect via a cable modem and the Cable TV Network 6, or even via the Satellite Network 50 using the pertinent modem and network equipment. The wireless PDA 4 and Web Cell Phone 5 usually connect using a Cell Network 8 using an analog modem. A general note about all CPE 16, is that because computational cryptography is used in the electronic commercial system 100, all CPE 16 needs to be capable of executing computations, i.e. include a computing unit in the device.

The various customer premise equipment (CPE) 16 access specific networks (e.g. the Cable TV Network 6, the PSTN 7 and the Cell Network 8) then connect to the Internet 12 via a Network Access Provider (NAP) 10. The NAP 10 is a service provider who sells network access services. The NAP 10 usually owns or leases the physical links to the customer "premise" (e.g. cable TV provider and cell network provider). The NAP 10 then connects to a Network Service Provider 9, who leases circuits from a NAP 10 and provides Internet 12 access to customers 19 via an Internet Service Provider (ISP) 11. Examples of ISPs 11 are AOL, Local Exchange Carriers (e.g. Bell Atlantic, SBC, etc.), Worldcom, AT&T, Erol's, etc.

For a customer 19 to connect to the Net 12, a network connection (i.e. logon) process is executed. This connect process entails the customer 19 using the customer premise equipment 16 to access the NAP 10 by connecting to a Network Access Server (NAS) 17. In the PSTN 7 network, the NAP 10 is serviced by a modem pool with a multiple telephone access numbers (see Table 2, Called-Station-Id). The NAS 17 authenticates the customer 19 and provides Internet 12 configuration information such as an Internet Protocol (IP) address, a Domain Name Server (DNS) address, etc. In the explosive growth of the Net 12, an ISP 11 has to manage thousands, if not millions, of customers 19. This is best achieved by managing a single database of customers 19, which allows for authentication as well as configuration information detailing the type of service that the customer 19 needs. Most ISPs 11 have implemented the Remote Authentication Dial-in Service (RADIUS) 18.

RADIUS 18 is an Internet 12 standard as specified in the Internet Engineering Task Force's RFC 2138 (http://www.ietf.org/rfc/rfc2138.txt) and 2139 (http://www.ietf.org/rfc/rfc2139.txt) documents. This protocol was developed by Rigney, et. al.. RADIUS 18 was originally developed by Livingston Enterprises for their PortMaster series of Network Access Servers and submitted to the Internet Engineering Task Force (IETF) to be adopted as an IP standard.

RADIUS 18 is so common that various companies sell computer systems implementing this technology. RADIUS 18 vendors include Steel-Belted Radius by Funk Software (www.funk.com), RBS RADIUS by Extent Technologies (www.extent.com), NTTacPlus from Master Soft (www.tacacs.net/products/nttacplus), the INA HFC Head-end product from Cocom (www.cocom.dk), etc. The Cocom product provides a RADIUS 18 product for a Cable TV Network 6 and the other products provide a RADIUS 18 product for PSTN 7 networks.

A description follows of the various key technologies that the preferred embodiment of the invention uses.

Remote Authentication Dial-In Service (RADIUS)

The RADIUS system is a client/server computer system. The availability and widespread use of RADIUS 18 is a key component of the preferred embodiment of this invention, specifically in implementing Address Verification Service 20.

A Network Access Server 17 (NAS) operates as a client of RADIUS 18. RADIUS 18 servers are responsible for receiving customer 19 network connection requests from a NAS 17, authenticating the customer 19 (e.g. via user id and password), and then returning all of the configuration information necessary for the client (i.e. the NAS 17) to deliver service (e.g. Internet 12 access) to the customer 19. A RADIUS 18 server can act as a proxy server to other RADIUS 18 servers, or other types of authentication servers.

A quick word about the use of passwords in computer systems today: passwords are usually user defined and hackers have evolved techniques to crack passwords. The online St Petersburg Times provides illuminating background on the history of hacking (http://www.sptimes/ Hackers/history.hacking.html). The more complex a password is, the safer it is from being cracked, but unfortunately the more difficult it is for the user to remember. Quite often a consequence of this is that some users write their passwords on a piece of paper and then paste the paper underneath their computer's keyboard or on the computer monitor.

Alternative user identification techniques have evolved besides typing in passwords to a computer authentication challenge, specifically Biometrics. Biometrics is equipment that authenticates users based on their unique biological features. Biometric authentication can be extremely secure because it authenticates biological characteristics that are unique to each user. Whilst possible, it is extremely difficult to steal or spoof these biological features, that include the human iris, fingerprints, voice and face recognition. This method of user authentication is in use, but is not yet widespread because of the complexity of the systems. Available commercial Biometric products include BioNetrix from BioNetrix Systems and BioLogon from Identicator Technology/Identix.

Another example of an alternative user identification method is the smart-card. Smart-cards have been in use in Europe for the past 25 years and are only recently gaining popularity in the US. American Express has signed up approximately 2 million users since it launched its smart-card, the Blue Card in 1999. The problem with the smart-card is that it requires a card reader attached to the CPE 16. The user still needs a password to authenticate himself (source: "U.S wises up to smart cards", Business Week, Aug. 28, 2000). It remains to be seen whether or not smart-cards gain critical mass is usage on the Internet 12.

Returning to the detailed description of the invention's preferred embodiment, transactions between the NAS 17 client and RADIUS 18 server are authenticated through the use of a shared secret, which is never sent over the network. The RADIUS 18 shared secret is based on the RSA Message Digest Algorithm MD5 (Rivest, R., and S. Dusse, "The MD5 Message-Digest Algorithm", RFC 1321, developed by the MIT Laboratory for Computer Science and RSA Data Security Inc.). In addition, any user passwords are sent encrypted between the NAS 17 client and RADIUS 18 server, to eliminate the possibility that someone snooping on an insecure network could determine a customer's password.

The RADIUS 18 server can support a variety of methods to authenticate a customer 19. When it is provided with the customer name and original password given by the customer 19, it can support PPP PAP or CHAP, UNIX login, and other authentication mechanisms.

All RADIUS transactions are composed of variable length Attribute-Length-Value 3-tuples (also known as a tag-length-value data structure), i.e. RADIUS 18 transaction data packets consist of an attribute identifier, followed by the length of the data packet in octets and then followed by the value of the attribute. New attribute values can be added without disturbing existing implementations of the protocol. For more details on the RADIUS protocol, refer to the IETF's RFC 2138 and RFC 2139.

Cryptography for Verification, Integrity and Confidentiality

Two key technologies that the preferred embodiment of the invention uses is public key and conventional cryptography to ensure three things: (1) that the transaction partner is who he claims to be, used in conjunction with AVS 20, (2) confidentiality of the data transmitted between the transaction partners and (3) that the data has not been altered during transmission. Various implementations of cryptography are used in the invention's preferred embodiment, such as Netscape's Secure Socket Layer (SSL), Phil Zimmerman's Pretty Good Privacy (PGP), Microsoft's Secure Electronic Transactions (SET), etc. All of these methods use a combination of public key and conventional cryptography.

Conventional cryptography is also called secret key or symmetric key cryptography. The Data Encryption Standard (DES), Triple Des and Message Digest 5 (MD5) are examples of symmetric key cryptography. MD5 is described in further detail in the IETF's RFC 1321. Use of secret keys to encrypt data is much faster than public key encryption, but the problem of using symmetric keys is the safe distribution of the keys between transaction partners. This key distribution is solved using public key cryptography.

Public key cryptography is an asymmetric method that uses a pair of keys for encryption: a public key that encrypts data and a private key (i.e. secret key) that decrypts the data. The public key is openly distributed. The key's owner keeps the private key secret. The secret key cannot readily be derived from the public key.

The above methods of cryptography are not described in detail in this invention. Excellent references are available that were used to devise the preferred embodiment of the invention. These references include:

"An Introduction to Cryptography" by Network Associates, Inc.

"How SSL Works" by Netscape.

"Internet Cryptography" by Richard E. Smith.

"A Course in Number Theory and Cryptography" by Neal Koblitz.

The Internet Engineering Task Force RFC library.

A brief description follows of the various cryptography implementations that the invention's preferred embodiment uses. PGP uses a combination of public-key and conventional encryption to provide security services for electronic mail messages and data files. These services include confidentiality and digital signature. The IETF has a number of RFCs on PGP, which is also known as OpenPGP, e.g. RFC 1991 ("PGP Message Exchange Formats") and RFC 2440 ("Open Message Format").

Some background on PGP now follows. When plaintext is encrypted with PGP, PGP first compresses the plaintext. Data compression saves data transmission time and device memory space and, more importantly, strengthens cryptographic security. Most cryptanalysis techniques exploit patterns found in the plaintext to decode the cipher. Compression reduces these patterns in the plaintext, thereby greatly enhancing resistance to cryptanalysis. PGP then creates a session key, which is a one-time-only secret key. This key is a random number generated from the random movements, e.g. of a computer's mouse and the keystrokes that are typed. This session key works with a very secure, fast conventional encryption algorithm to encrypt the plaintext; the result is ciphertext. Once the data is encrypted, the session key is then encrypted to the recipient's public key. This public key-encrypted session key is transmitted along with the ciphertext to the recipient.

Decryption works in the reverse. The recipient's copy of PGP uses her private key to recover the temporary session key, which PGP then uses to decrypt the conventionally-encrypted ciphertext.

The combination of the two encryption methods combines the convenience of public key encryption with the speed of conventional encryption. Conventional encryption is about a thousand times faster than public key encryption. Public key encryption in turn provides a solution to key distribution and data transmission issues. Used together, performance and key distributions are improved without any sacrifice in security.

A cryptographic key is a value that works with a cryptographic algorithm to produce a specific ciphertext. Keys are basically very large numbers. Key size is measured in bits; the number representing a 1024-bit key is computationally very large. In public key cryptography, the bigger the key, the more secure the ciphertext. However, public key size and conventional cryptography's secret key size are totally unrelated. A conventional 80-bit key has the equivalent strength of a 1024-bit public key. A conventional 128-bit key is equivalent to a 3000-bit public key. Again, the bigger the key, the more secure, but the algorithms used for each type of cryptography are very different. While the public and private keys are mathematically related, it's very difficult to derive the private key given only the public key; however, deriving the private key is always possible given enough time and computing power. This makes it very important to pick keys of the right size; large enough to be secure, but small enough to be applied fairly quickly. Larger keys will be cryptographically secure for a longer period of time. Keys are stored in encrypted form. PGP stores the keys in two files on the customer premise equipment 16: one for public keys and one for private keys. These files are called keyrings. If the private keyring is lost, the user will be unable to decrypt any information encrypted to keys on that ring. As with any user generated electronic file, it is advisable for the user to back up these PGP keyrings to floppy disk, Zip disk, or any other appropriate electronic media.

The invention's preferred embodiment uses PGP to create digital certificates. Digital certificates (certificates) allow the recipient of information to verify the authenticity of the information's origin. In other words, digital certificates provide authentication and data integrity. Non-repudiation is also provided. A digital certificate consists of three components:

A public key

Certificate information, e.g. customer 19 name, customer 19 network logon user ID, customer 19 billing address, etc.

One or more digital signatures.

The purpose of a digital signature on a certificate is to attest that the certificate information has been electronically notarized by some other person or entity, e.g. from a trusted third party such as the Certificate Authority 15. The digital signature does not validate the authenticity of the whole certificate; it only vouches that the signed identity information goes along with the public key. PGP uses a one-way hash function to create a digital signature. Valid hash functions used in the IETF's OpenPGP include MD2, MD5, SHA-1 and RIPEMD-160. PGP uses a hash function on the certificate information that is being signed. This generates a fixed length data item known as a message digest. Any alteration to the certificate information results in a totally different message digest (digest), i.e. data integrity is established. PGP then uses the message digest and the private key to create the digital signature. Upon receipt of the certificate, the recipient uses PGP to re-compute the message digest, thus verifying the signature. As long as a secure hash function is used, there is no way to take someone's signature from one document and attach it to another, or to alter a signed message in any way. The slightest change in a signed document will cause the digital signature verification process to fail.

In June 2000 the US Congress passed an act (the Electronic Signatures in Global and National Commerce Act) to legally accept digital signatures in electronic transactions. In July 2000 President Clinton signed the Electronic Signatures in Global and National Commerce Act.

The preferred embodiment uses various trusted parties to create digital certificates. For example in FIG. 3, the customer issuer bank 29 issues a customer's 19 credit card digital certificate 36(*b*) (defined in Table 5(b)), the ISP 11 issues the customer's 19 and merchant's 13 Internet 12 logon digital certificates 40(*b*) (defined in Table 4(b)), and 41(*b*) (defined in Table 7(b)) respectively. Various formats exist for digital certificates including PGP and the International Telecommunications Union's (ITU) X.509 certificates. The preferred embodiment of the invention uses PGP certificates, but could easily use X.509 certificates, or other certificate formats. The format of a PGP certificate is as follows:

The PGP version number—identifies which version of PGP was used to create the key associated with the certificate.

The certificate holder's public key—public portion of the holder's asymmetric key pair together with the algorithm of the key: RSA, Diffie-Hellman, or DSA.

The certificate holder's information—e.g. customer 19 name, customer 19 network logon user ID, customer 19 billing address, etc.

The digital signature of the certificate owner—uses the private key of the certificate holder's public key.

The certificate's validity period—start date and expiration date.

The preferred symmetric key method for the key—e.g. Triple-DES, CAST or IDEA.

SSL has been universally accepted on the Internet 12 for authenticated and encrypted communication between clients and servers. Considering the Open Systems Interconnection (OSI) model, the SSL protocol runs above TCP/IP (transport layer, i.e. layer 4 in the OSI model) and below higher-level protocols such as HTTP or SMTP (presentation and application layers, i.e. layers 6 and 7 in the OSI model). SSL runs in the session layer, layer 5 in the OSI model. It uses TCP/IP on behalf of the higher-level protocols, and in the process allows an SSL-enabled server to authenticate itself to an SSL-enabled client, allows the client to authenticate itself to the server, and allows both machines to establish an encrypted connection. These capabilities address fundamental concerns about secure communication over the Internet 12 and other TCP/IP networks such as the Cable TV Network 6 and the Cell Network 8:

SSL server authentication allows a user to confirm a server's identity. SSL-enabled client software running on customer premise equipment 16 can use standard techniques of public-key cryptography to check that a server's certificate and public ID are valid and have been issued by a certificate authority 15 (CA) listed in the client's list of trusted CAs.

SSL client authentication allows a server (e.g. the customer issuer bank 29, the merchant bank 14, the certificate authority 15, etc.) to confirm a user's identity. Using the same techniques as those used for server authentication, SSL-enabled server software can check that a client's certificate and public ID are valid and have been issued by a certificate authority 15 listed in the server's list of trusted CAs.

An encrypted SSL connection requires all information sent between a client and a server to be encrypted by the sending software and decrypted by the receiving software, thus providing a high degree of confidentiality. Confidentiality is important for both parties to any private transaction. In addition, all data sent over an encrypted SSL connection is protected with a mechanism for detecting tampering, that is for automatically determining whether the data has been altered in transit.

The SSL protocol includes two sub-protocols: the SSL record protocol and the SSL handshake protocol. The SSL record protocol defines the format used to transmit data. The SSL handshake protocol involves using the SSL record protocol to exchange a series of messages between an SSL-enabled server and an SSL-enabled client when they first establish an SSL connection. This exchange of messages is designed to facilitate the following actions:

Authenticate the server to the client.
Allow the client and server to select the cryptographic algorithms, or ciphers, that they both support.
Optionally authenticate the client to the server.
Use public-key encryption techniques to generate shared secrets.
Establish an encrypted SSL connection.

For more details on SSL, the Netscape web site provides a wealth of information at http://developer.netscape.com/docs/manuals/security.

TLS (Transport Layer Security) is a new and evolving Internet Engineering Task Force (IETF) standard and is based on SSL. TLS is defined in RFC 2818 ("HTTP Over TLS").

This invention does not exclude the use of TLS in place of SSL when TLS is adopted on the Internet 12. Use of Microsoft's SET patent is also supported.

Address Verification Service (AVS)

So how do we verify that the various parties in the electronic commerce system 100, e.g. the customer 19 and the merchant 13 are who they say they are? The key to answering this question is similar to the key in the real estate business—location, location, location. The preferred embodiment of this invention answers this question by knowing where the commerce party, e.g. the customer 19 logs onto the Internet 12. This is used in conjunction with the various parties' digital certificates.

Using the verification of the customer 19 as an example, the AVS process is now described. The customer 19 could log on from various CPE 16 (e.g. WebTv 1, Web Phone 2, PC 3, PDA 4, Web Cell Phone 5, etc.) using a variety of networks (e.g. cable TV network 6, PSTN 7, cell network 8, etc.). When the customer logs onto the Internet 12 using an ISP 11, the Internet 12 access software resident on the CPE 16 connects to the ISP's 11 Network Access Server 17 (NAS). The NAS 17 authenticates the customer 19 and connects him to the Internet 12. Note that this process is the similar for any entity that connects to the Internet 12, i.e. the merchant 13, the merchant bank 14, the certificate authority 15, the customer issuer bank 29, etc.

Summarizing the interaction of a Network Access Server 17 (NAS) and a RADIUS 18 server, the NAS server operates as a client of RADIUS 18. RADIUS servers are responsible for receiving customer 19 network connection requests from a NAS 17, authenticating the customer 19 (e.g. via user id and password), and then returning all of the configuration information necessary for the client (i.e. the NAS 17) to deliver service (e.g. Internet 12 access) to the customer 19.

The ISP's 11 RADIUS server keeps track of from where the customer 19 (and others as mentioned above) have logged onto the Internet 12, and when they log off from the Internet 12. This feature is key to the invention's address verification system 20: The various participants of the electronic commerce system 100 register with a trusted third party (i.e. the certificate authority 15), sharing their valid Internet 12 connection points, i.e. where they log onto the Net 12 from. The connection points include the name of the ISP 11, as well as the access number from where they connect to the ISP 11 (i.e. a RADIUS 18 attribute Calling-Station-Id in Table 2). If another entity does not connect from these valid points of presence, using the correct logon profiles (user id and password, etc.), then the entity's connection cannot be trusted and hence the commercial transaction should not be accepted between the participants. On the other hand, the entity could be valid, but has simply connected from an "invalid", i.e. unregistered point of presence. The entity then needs to update this point of presence information with the trusted third party (i.e. CA 15) before usually continuing with the business transaction. The process of updating the trusted third party with this information is similar to that described in the relevant section titled Registration Process.

Although the RADIUS 18 server stores all of the IETF's RFC 2138 and RFC 2139 attributes, the following electronic commerce participants' (e.g. the customer 19 and the merchant 13) connection attributes are specifically used in the preferred embodiment's implementation for AVS 20, but is not limited to the following attributes:

TABLE 2

| RADIUS Attribute | Definition |
| --- | --- |
| User-Name | The name of the electronic commerce participant (e.g. the customer 19) to be authenticated. |
| NAS-Identifier | A string identifying the NAS 17 originating the access request. |
| NAS-IP-Address | The identifying IP address of the NAS 17, which is requesting authentication of the electronic commerce participant, e.g. the customer 19. |
| Login-IP-Host | The system with which to connect the electronic commerce participant, e.g. the customer 19. |
| Login-Service | The service which should be used to connect the electronic commerce participant (e.g. the customer 19) to the login host. |
| Called-Station-Id | The phone number that the electronic commerce participant (e.g. the customer |

TABLE 2-continued

| RADIUS Attribute | Definition |
| --- | --- |
| | 19) called, using Dialed Number Identification (DNIS) or similar technology. |
| Calling-Station-Id | The phone number that the call came from, using Automatic Number Identification (ANI) or similar technology. |
| Acct-Status-Type | Indicates whether this accounting request marks the beginning of the electronic commerce participant (e.g. the customer 19) service (Start) or the end (Stop). |
| Acct-Session-Id | Unique accounting ID to make it easy to match start and stop records in a log file. The start and stop records for a given session have the same Acct-Session-Id. |
| Acct-Terminate-Cause | Indicates how the session was terminated |

The preferred embodiment of the invention has added the following RADIUS protocol attributes, as detailed in Table 3. These attributes contribute to options as to where, e.g. the customer 19 and the merchant 13 have logged onto the Internet 12, as well as other valid commerce transaction data, e.g. the customer's shipping addresses. These attributes are important to the Address Verification Service 20 of the preferred embodiment of the invention.

TABLE 3

| AVS RADIUS Attribute | Definition |
| --- | --- |
| Alternate-NAS-Identifier | A string identifying the customer's 19 alternative NAS originating the access request. For example, this could be the customer's 19 work NAS 17. |
| Alternate-NAS-IP-Address | The alternative identifying IP address of the NAS 17, which is requesting authentication of; e.g. the customer 19 or the merchant 13. For example, this could be the customer's 19 work NAS 17. |
| Alternate-Called-Station-Id | The alternative phone number that the customer 19 called, using Dialed Number Identification (DNIS) or similar technology. For example, this could be the customer's 19 work NAS 17 access phone number, or a customer's web cell phone 5 NAS 17 access phone number. |
| Alternate-Calling-Station-Id | The alternative phone number that the call came from, using Automatic Number Identification (ANI) or similar technology. For example, this could be the customer's 19 work phone number, or a customer's web cell phone 5 number. |
| Shipping-Address | A string identifying the customer's 19 shipping address. |
| Alternative-Shipping-Address | A string identifying the customer's 19 alternative shipping address. For example, this could be the customer's 19 work address. |
| Public-Key | The RADIUS server's ISP's 11 publicly available encryption key. This key is registered with the CA 15. |

When an electronic commerce participant e.g. the customer 19 logs onto the Net 12, in the invention's preferred embodiment the RADIUS 18 server encrypts all of the fields described in Tables 2 and 3, excluding the attributes Acct-Status-Type and Acct-Terminate-Cause, as a digital certificate, together with the ISP's 11 digital signature. This digital certificate, i.e. the logon certificate is encrypted using either the ISP's 11 public key, or the certificate authority's 15 public key. The use of either the ISP's 11 or the certificate authority's 15 public key depends who provides the Address Versification Service 20 in an Internet 12 electronic transaction between the customer 19 and the merchant 13. The preferred embodiment uses the CA 15 as an example, because it is easier to centralize this service with a CA 15 rather than an ISP 11. The reason is that a greater variety of ISPs 11 are used on the Internet 12 to connect various participants to the Net 12. Currently the use of a variety Certificate Authorities 15 is much less than the use of multiple ISPs 11, hence to centralize AVS 20 through a certificate authority 15 would be easier. Remember that the RADIUS 18 server resides at an ISP 11 and the fewer trusted AVS 20 connection requests that need to be established, the better, especially amongst competitors.

Figure 3:
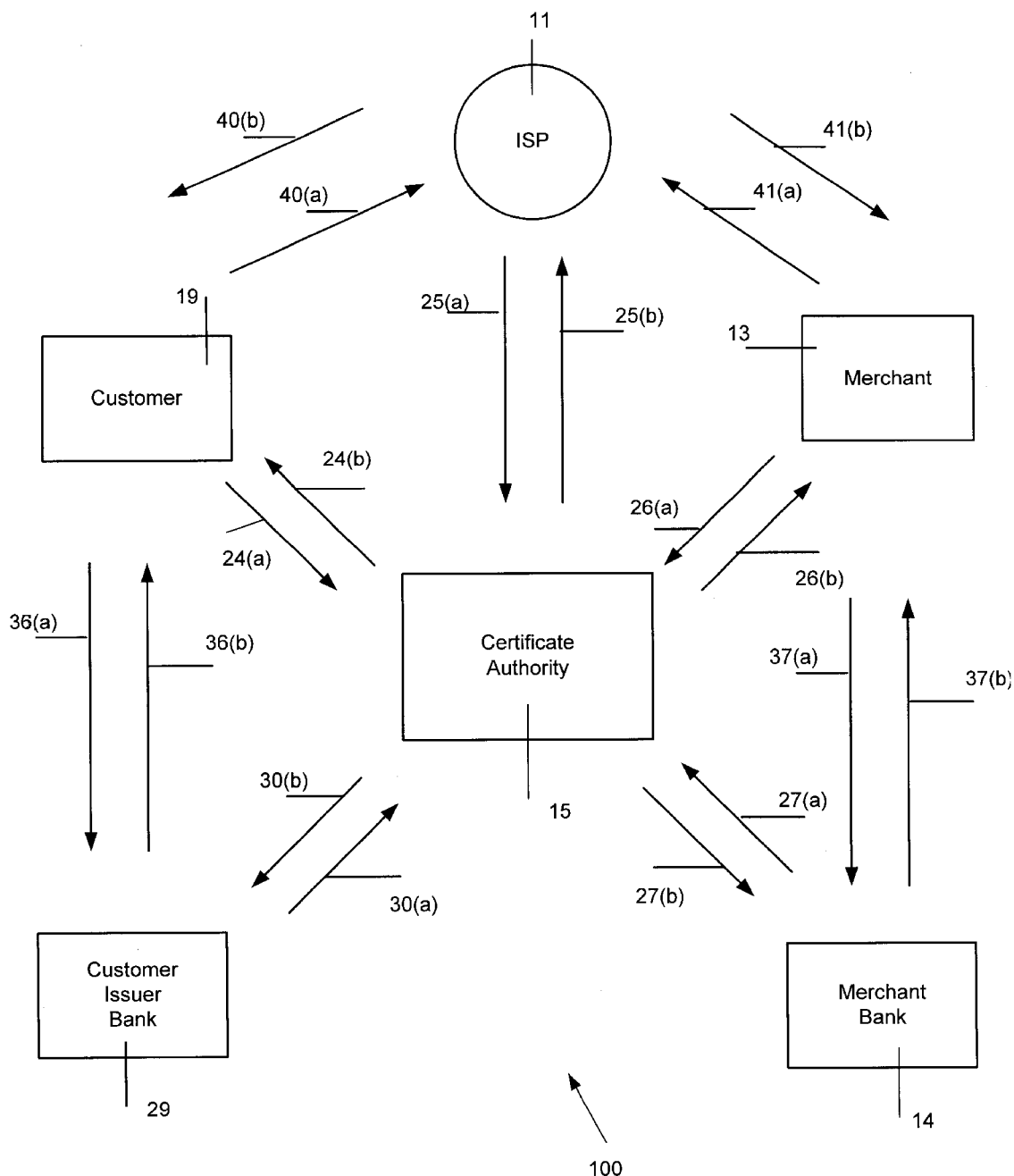
FIG. 3 is a schematic of an electronic commerce during a registration process according to the preferred embodiment of this invention.

As is illustrated in FIGS. 2 and 3 the RADIUS 18 server transmits the customer's 19 logon digital certificate 40(b) to the customer premise equipment 16, which stores the received certificate on the CPE 16 device. The Address Verification System 20 uses the customer 19 logon digital certificate 40(b) during an electronic commerce transaction. Similarly the RADIUS 18 server can transmit other online parties' logon digital certificates. These online parties could include another customer 19, the merchant 13 (logon digital certificate 41(b)), the customer's bank 29, the merchant's bank 14 and a trusted party that is represented in the diagrams as the certificate authority 15.

When the customer 19 logs off the Internet 12, the RADIUS 18 server could transmit a new customer 19 logon digital certificate specifying that the customer has logged off of the Internet 12. Alternatively the AVS 20 could determine the customer 19's online status by requesting the status from the customer 19's ISP 11. When a participant logs off the Internet 12, the RADIUS 18 Acct-Terminate-Cause attribute is set and stored in the database. Various implementations of RADIUS 18 use a multiplicity of database technologies such as LDAP, Oracle, Sybase, UNIX and Microsoft user logon databases, etc.

Let's consider the case if a customer's CPE 16 is stolen, e.g. a web cell phone 5 and a PC 3. In the case of the web cell phone 5 today the customer 19 reports the theft to his phone company and the service is disconnected. At the same time, the customer 19 should contact his CA 15 to disable, i.e. revoke his digital certificate. If the relevant business relationship is set up, the customer's phone company could automatically notify the customer's CA 15. In the scenario of the customer's digital certificate being comprised by the thief, it's not as simple as using the phone service. Remember that the customer 19 needs to enter a pass phrase to use the digital certificate. In the case of a PC 3 theft, in all likelihood the thief would not use the device on the customer's premises, but would abscond to his residence. Now if the thief uses the customer's PC 3, both the ISP 11 and the various RADIUS 18 attributes for the thief's logon would probably be different than the customer's RADIUS attributes (unless, e.g. the thief lived in the same residence as the customer 19). For example, the Calling-Station-Id and Called-Station-Id (see Tables 2) would be different. Consequently during an electronic commerce transaction, AVS 20 would reject the address verification. On the other hand, if the thief transacts a commerce transaction at the customer's premise, there are still hurdles that the thief has to overcome. For example, as mentioned in the case of the web cell phone 5, customer 19 needs to enter a pass phrase to use the digital certificate stored on the PC 3. The thief would have to know this pass phrase. In the advent that the customer 19 has taped the pass phrase to the PC 3 (this does happen), the thief's Shipping-Address would not match the customer's Shipping-Address and hence the merchant 13 could deny the transaction.

Registration Process

Each participant in the electronic commerce system 100 needs to initially register with the relevant business partners, e.g. with the certificate authority 15 (CA) and the various banks 29 and 14. FIG. 3 illustrates this process. This registration process forms the foundation of trust necessary in an electronic commerce system 100. Similar trust is necessary in any commercial system, whether it is bartering for farm produce, or fund transfers between federal banks, etc.

The certificate authority 15 is a trusted third party that all participants in the electronic commerce system 100 trust. Examples of such a trusted third party are the US Federal Reserve, the US Post Office, Verisign, Citibank, inventors, etc. Note that in an electronic commerce system 100 a multiplicity of CAs 15 may exist. To simplify the description of the preferred embodiment, a single CA 15 is used, but to those versed in the art, it is obvious that multiple CAs 15 could and most probably would be used in an electronic commerce system 100. A side note: some of the registrants' information is stored in a database with the CA 15, hence it will be noted that not all of the registration information is returned in the relevant registration response. At any time during the commerce transaction, the database can be accessed by the CA 15 using pertinent database keys.

Each participant in the registration process creates an electronic commerce system 100 registration data packet, i.e. a registration request that is specific to each participant. This registration data packet (i.e. digital certificate or credential) is illustrated in FIG. 3 as 24(*a*), 25(*a*), 26(*a*), 27(*a*), 30(*a*), 36(*a*), 37(*a*), 40(*a*) and 41(*a*). The recipient then acknowledges each registration request by responding with an appropriate response. The registration response packet is illustrated in FIG. 3 as 24(*b*), 25(*b*), 26(*b*), 27(*b*), 30(*b*), 36(*b*), 37(*b*), 40(*b*) and 41(*b*). The originator of the certificate signs all of the registration certificates. As previously mentioned this provides authenticity for the certificate, as well as a means to check the integrity of the information contained in the digital certificate. In other words, this means prevention of tampering with the certificate's information.

The various Registration Process requests and responses are now discussed:

Customer Registration/Response with/from the ISP—40(*a*) and 40(*b*)

In FIG. 3, the customer 19 registers with his ISP 11. In FIG. 3 this is shown as registration request 40(*a*). The goal of this registration process is to receive a signed digital certificate (i.e. a credential) from the ISP 11 that contains the customer's 19 Internet 12 access information. In FIG. 3 the returned customer's digital certificate from the ISP 11 is illustrated by the arrow 40(*b*) and the contents of the certificate (i.e. the credential) are described in Table 4(b). The information contained in the certificate 40(*b*) is used during the address verification service 20 of the transaction process of the electronic commerce system 100. The relevant components of the customer's ISP logon information will be encrypted with the ISP's public key so that only the ISP 11 can decrypt this confidential data. An example of this confidential information is a customer's Calling-Station-Id and Alternate-Calling-Station-Ids as described in Tables 2 and 3. A note on the Calling-Station-Ids, these are the usually phone numbers from where the customer 19 has logged onto the Internet 12 from, i.e. the Primary-Phone-Number and Alternate-Phone-Number[s] as described in Table 4(a). This information will be used during the preferred embodiment's AVS 20 process during the transaction phase of the electronic commerce system 100 as depicted in FIG. 4. Other confidential information could include pass phrases that the customer 19 could be challenged with in the situation of a questionable electronic transaction. For example, in a MOTO transaction customer issuer bank 29 sometimes uses a customer's mother's maiden name for a pass phrase. Later in the electronic commerce system 100, the customer 19 will use this digital certificate 40(*b*) when transacting business with a merchant 13 (see FIG. 4).

TABLE 4(a)

| Customer - ISP Registration-Request Attribute | Definition |
|---|---|
| 1. Customer-Name | Customer's full name, i.e. first name, middle name[s] and last name. |
| 2. Primary-Phone-Number | The customer's primary telephone number, including area code. This is the number from where the customer 19 usually logs onto the Internet 12. This is equivalent to the Calling-Station-Id in Table 2. |
| 3. Alternate-Phone-Number[s] | Alternate phone numbers to the Primary-Phone-Number. For example, this could be the customer 19 work phone number, or the customer's cell phone number. This is equivalent to the Alternate-Calling-Station-Id in Table 3. |
| 4. Certificate-Authority-Name | Customer's certificate authority 15 name. This is included in the case of multiple CAs 15 being used in the commercial transaction. |
| 5. Email-Address | Customer's electronic mail address. |
| 6. Encrypted-ISP-Pass-Phrase | Customer's pass phrase that he could be challenged for by the ISP 11. This data is encrypted with the ISP's public key. |
| 7. Public-Key | The customer's publicly available encryption key. This key is registered with the CA 15. |
| 8. Digital-Signature | Customer's electronic identification using a public key system. |
| 9. Public-Key-Encryption-Version | Version of the Public Key Infrastructure (PKI) that is used by the customer 19. |

TABLE 4(b)

| Customer - ISP Registration-Response Attribute | Definition |
|---|---|
| 1. Customer-Name | Customer's full name, i.e. first name, middle name[s] and last name. |
| 2. Customer-Email-Address | Customer's electronic mail address. |
| 3. Customer-Primary-Phone-Number | The customer's primary telephone number, including area code. This is the number from where the customer 19 usually logs onto the Internet 12. This is equivalent to the Calling-Station-Id in Table 2. |
| 4. Alternate-Customer-Phone-Number[s] | Alternate customer's phone numbers to the Primary-Phone-Number. For example, this could be the customer 19 work phone number, or the customer's cell phone number. This is equivalent to the Alternate-Calling-Station-Id in Table 3. |
| 5. ISP-Name | Business name of the customer's ISP 11. |
| 6. Certificate-Authority-Name | ISP 11 certificate authority 15 name. This is included in the case of multiple CAs 15 being used in the commercial transaction. |
| 7. Encrypted-ISP-Certificate-Authority-Information | RADIUS 18 customer's unique logon User-Name, AVS 20 server IP address encrypted with the certificate authority 15's public key. This data is used during AVS. |
| 8. Encrypted-ISP-Customer-Information | RADIUS 18 customer's logon User-Name, Calling-Station-Id and Alternate-Calling-Station-Ids encrypted with the ISP 11's public key. See Table 2 for more detail on these RADIUS 18 attributes. |
| 9. Certificate-Issue-Date | Date on which the ISP 11 issued the customer's digital certificate 40(b), i.e. the certificate containing this table's information (Table 4(b)). |

TABLE 4(b)-continued

| Customer - ISP Registration-Response Attribute | Definition |
|---|---|
| 10. Certificate-Expiration-Date | Date on which the ISP 11 expires the customer's digital certificate 40(b), i.e. the certificate containing this table's information (Table 4(b)). |
| 11. Public-Key | The ISP's publicly available encryption key. This key is registered with the CA 15. |
| 12. Digital-Signature | ISP's electronic identification using a public key system. |
| 13. Public-Key-Encryption-Version | Version of the Public Key Infrastructure (PKI) that is used by the ISP 11. |

Customer Registration/Response with/from the Customer Issuer Bank—36(a) and 36(b)

In FIG. 3, the customer 19 registers with his credit card issuer bank, the customer issuer bank 29. In FIG. 3 this is shown as registration request 36(a). The goal of this registration process is to receive a signed digital certificate (i.e. a credential) from the customer issuer bank 29 that contains the customer's encrypted credit card information. In FIG. 3 the returned customer 19 digital certificate from the customer issuer bank 29 is illustrated by the arrow 36(b) and the contents of the certificate (i.e. the credential) are described in Table 5(b). The relevant parts of the credit card information are encrypted with the customer issuer bank's 29 public key so that only the bank can decrypt the confidential data. An example of this confidential information is a customer's 19 credit card account number. Other confidential information could include pass phrases that the customer 19 could be challenged with in the advent of a questionable electronic transaction. As mentioned previously, an example of such a pass phrase is the customer's mother's maiden name. Later in an electronic commerce system 100 (see FIG. 4), the customer 19 will use this digital certificate 36(b) when transacting business with a merchant 13. The reason that the customer 19 credit card information is encrypted with the customer issuer bank 29 public key is simply because only the bank needs to know the confidential details of a customer 19 credit card in order to debit the customer 19 and to credit the merchant 13. The preferred embodiment's implementation of the electronic commerce system 100 is based on "for your eyes only" principle, i.e. only participants who need information will be able to access the relevant encrypted information. This is implemented using asymmetric key cryptography.

Using this method of encrypting "for your eyes only" information, the previously mentioned situation that the online music retailer CDUniverse was hacked and thousands of its customers' credit-card numbers was published on the Net, would now be avoidable. The reason is that the customer issuer bank 29 could only decrypt the credit card numbers.

Many consumers have more than one credit card and in the physical world they hold these cards in a wallet. In the digital world a similar concept to the wallet has been conceived of, i.e. the digital wallet. A digital wallet (i.e. e-wallet) is simply client side software on the CPE 16 that holds a multiplicity of digital certificates. These digital certificates contain the customer's credit card information, i.e. the digital certificate 36(b) that is described in Table 5(b). Hence when a customer 19 transacts with a merchant 13, the customer 19 can select the credit card (i.e. digital certificate) that he wishes to use to pay for the commercial transaction. The digital wallet concept is common in the SET system from Microsoft.

Table 5(a) describes the general contents of the customer's registration request 36(a) to the customer issuer bank 29. The goal of this request to establish a notarized certificate (i.e. a credential) with the customer's 19 relevant credit card information that can be used in an electronic transaction in the electronic commerce system 100. A side note about the customer's credit card expiration date. Even though in the preferred embodiment of the invention the expiration date is included in the encrypted portion of this certificate, this information could be stored in clear text. If this is done, it could save a possible step in the electronic commerce system 100, because if the customer's credit card has expired and the merchant 13 can see it, he could deny the transaction from continuing. On the other hand, if the expiration date is encrypted with the customer issuer bank 29 public key, then only the bank could determine that the transaction is invalid because the customer's credit card has expired. Individual banks could determine this implementation choice during the registration process.

Note that it is feasible to have a central trusted clearing-house, e.g. the CA 15 that could register all requests with the customer's various issuer banks. The preferred embodiment does not implement the clearing-house concept, but does not rule out its use either.

TABLE 5(a)

| Customer - Customer Issuer Bank Registration-Request Attribute | Definition |
|---|---|
| 1. Customer-Name | Customer 19 full name, i.e. first name, middle name[s] and last name. |
| 2. Billing-Address | Street address to which the customer issuer bank 29 mails the customer 19 credit card bill. |
| 3. Primary-Phone-Number | The customer's primary telephone number, including area code. This is the number from where the customer 19 usually logs onto the Internet 12. This is equivalent to the Calling-Station-Id in Table 2. |
| 4. Alternate-Phone-Number[s] | Alternate phone numbers to the Customer-Primary-Phone-Number. For example, this could be the customer 19 work phone number, or the customer web cell phone 5 number. This is equivalent to the Alternate-Calling-Station-Id in Table 3. |
| 5. Email-Address | Customer's 19 electronic mail address. |
| 6. Encrypted-Credit-Card-Information | Customer's credit card account number, expiration date encrypted with the customer issuer bank 29's public key. |
| 7. Certificate-Authority-Name | Customer's certificate authority 15 name. This is included in the case of multiple CAs 15 being used in the commercial transaction. |
| 8. Public-Key | The customer's publicly available encryption key. This key is registered with the CA 15. |
| 9. Digital-Signature | Customer's electronic identification using a public key system. |
| 10. Public Key Encryption Version | Version of the Public Key Infrastructure (PKI) that is used by the customer 19. |

Table 5(b) describes the general contents of the customer's 19 registration response 36(b) (i.e. the credential) from the Customer Issuer Bank 29. This information will be submitted to a merchant 13 during the transaction phase of the electronic commerce system 100, as pictured in FIG. 4. Note that for each credit card a customer 19 uses in the electronic commerce system 100, the customer 19 needs to register each card with the card's issuer bank 29 and receive a credential 36(b) for the card. This credential (i.e. digital certificate) could then be entered into the customer's digital wallet.

TABLE 5(b)

| Customer - Customer Issuer Bank Registration-Response Attribute | Definition |
|---|---|
| 1. Customer-Name | Customer 19 full name, i.e. first name, middle name[s] and last name. |
| 2. Customer-Primary-Phone-Number | The customer's primary telephone number, including area code. This is the number from where the customer 19 usually logs onto the Internet 12. This is equivalent to the Calling-Station-Id in Table 2. This number could also be used to contact the customer for further transaction validation. |
| 3. Customer-Alternate-Phone-Number[s] | Alternate phone numbers to the customer's Primary-Phone-Number. For example, this could be the customer 19 work phone number, or the customer web cell phone 5 number. This is equivalent to the Alternate-Calling-Station-Id in Table 3. |
| 4. Customer-Certificate-Authority-Name | Customer's certificate authority 15 name. This is included in the case of multiple CAs 15 being used in the commercial transaction. |
| 5. Issuer-Bank-Name | Customer Issuer Bank 29 business name. |
| 6. Encrypted-Credit-Card-Information | Customer's credit card account number, expiration date encrypted with the customer issuer bank 29's public key. |
| 7. Email-Address | Customer Issuer Bank 29 electronic mail address. |
| 8. Certificate-Authority-Name | Customer Issuer Bank 29 certificate authority 15 name. This is included in the case of multiple CAs 15 being used in the commercial transaction. |
| 9. Certificate-Issue-Date | Date on which the Customer Issuer Bank 29 issued the customer's digital certificate 36(b), i.e. the certificate containing this table's information (Table 5(b)). |
| 10. Certificate-Expiration-Date | Date on which the Customer Issuer Bank 29 expires the customer's digital certificate 36(b), i.e. the certificate containing this table's information (Table 5(b)). |
| 11. Public Key | The customer issuer bank's 29 publicly available encryption key. This key is registered with the CA 15. |
| 12. Digital-Signature | Customer issuer bank's 29 electronic identification using a public key system. |
| 13. Public-Key-Encryption-Version | Version of the Public Key Infrastructure (PKI) that is used by the Customer Issuer Bank 29. |

Customer Registration/Response with/from the Certificate Authority—24(a) and 24(b)

Table 6(a) describes the general contents of the customer's registration request 24(a) to the trusted third part, i.e. the Certificate Authority 15. The goal of this request to establish a notarized certificate (i.e. a credential) 24(b) with the customer's relevant personal information that can be used in an electronic transaction in the electronic commerce system 100.

TABLE 6(a)

| Customer - Certificate Authority Registration-Request Attribute | Definition |
|---|---|
| 1. Customer-Name | Customer 19 full name, i.e. first name, middle name[s] and last name. |
| 2. Billing-Address | Street address to which the various commerce transaction parties mail to the customer 19 information, e.g. bills, etc. |
| 3. Primary-Shipping-Address | The primary street address to where the customer 19 usually receives shipped merchandise deliveries. This is equivalent to Shipping-Address in Table 3. |
| 4. Alternate-Shipping-Address[es] | Alternate street addresses to the Primary Shipping Address. For example, this could be the customer 19 work address, or a friendly neighbor's street address. This is equivalent to Alternate-Shipping-Address in Table 3. |
| 5. Primary-Phone-Number | The customer's primary telephone number, including area code. This is the number from where the customer 19 usually logs onto the Internet 12. This is equivalent to the Calling-Station-Id in Table 2. |
| 6. Alternate-Phone-Number[s] | Alternate phone numbers to the Primary-Phone-Number. For example, this could be the customer 19 work phone number, or the customer 19 cell phone number. This is equivalent to the Alternate-Calling-Station-Id in Table 3. |
| 7. Email-Address | Customer's 19 electronic mail address. |
| 8. Alternate-Email-Address[es] | Alternate customer 19 electronic mail addresses. For example, this could be the work email address of the customer 19. |
| 9. Primary-Credit-Card-Issuer Name | Customer issuer bank 29 name or identifier, e.g. Citibank issues Visa and MasterCard credit cards to a customer 19. |
| 10. Encrypted-Primary-Credit-Card-Information | Customer's 19 primarily used credit card account number, expiration date and other relevant data. This information is encrypted using the credit card bank's 29 public key. |
| 11. Alternate-Credit-Card-Issuer-Name[s] | Customer's alternately used credit card customer issuer bank's 29 name. This could be multiple records, each explicitly linked to a specific Alternate-Encrypted-Credit-Card-Information record. |
| 12. Alternate-Encrypted-Credit-Card-Information | Customer's alternately used credit card account number, expiration date and other relevant data. This information is encrypted using the credit card bank's 29 public key. This could be multiple records, each encrypted with the customer issuer bank's 29 public key. |
| 13. ISP-Name | Business name of the customer's ISP 11. |
| 14. ISP-Certificate-Authority-Name | Customer's ISP 11 certificate authority name. This is included in the case of multiple CAs 15 being used in the commercial transaction. |
| 15. Encrypted-Customer-ISP-Certificate-Authority-Information | RADIUS 18 customer's unique logon User-Name, AVS 20 server IP address encrypted with the certificate authority 15's public key. |
| 16. Encrypted-Customer-ISP-Information | RADIUS 18 customer's logon User-Name, Calling-Station-Id and Alternate-Calling-Station-Ids encrypted with the ISP 11's public key. See Table 2 for more detail on these RADIUS 18 attributes. |
| 17. Public-Key | Customer's publicly available encryption key. This key is registered with the CA 15. |
| 18. Digital-Signature | Customer's electronic identification using a public key system. |
| 19. Public-Key-Encryption-Version | Version of the Public Key Infrastructure (PKI) that is used by the customer 19. |

Table 6(b) describes the general contents of the customer's 19 registration response 24(b) (i.e. the credential) from the trusted third part, the Certificate Authority 15.

TABLE 6(b)

| Customer - Certificate Authority Registration-Response Attribute | Definition |
|---|---|
| 1. Customer-Name | Customer 19 full name, i.e. first name, middle name[s] and last name. |
| 3. Shipping-Address | The primary street address to where the customer 19 usually receives shipped merchandise deliveries. This is equivalent to the Shipping-Address in Table 3. |
| 4. Alternate-Shipping-Address[es] | Alternate street addresses to the primary Shipping-Address. For example, this could be the customer 19 work address, or friendly neighbor's street address. This is equivalent to the Alternate-Shipping-Address in Table 3. |
| 5. Primary-Phone-Number | The customer's primary telephone number, including area code. This is the number from where the customer 19 usually logs onto the Internet 12. This is equivalent to the Calling-Station-Id in Table 2. |
| 6. Alternate-Phone-Number[s] | Alternate phone numbers to the Primary-Phone-Number. For example, this could be the customer's work phone number, or the customer's web cell phone 5 number. This is equivalent to the Alternate-Calling-Station-Id in Table 3. |
| 7. Email-Address | Customer's 19 electronic mail address. |
| 8. Alternate-Email-Address[es] | Alternate customer 19 electronic mail addresses. For example, this could be the work email address of the customer 19. |
| 9. ISP-Name | Business name of the customer's ISP 11. |
| 10. Certificate-Issue-Date | Date on which the certificate authority 15 issued the customer's digital certificate 24(b), i.e. the certificate containing this table's information (Table 6(b)). |
| 11. Certificate-Expiration-Date | Date on which the CA 15 expires the customer's digital certificate 24(b), i.e. the certificate containing this table's information (Table 6(b)). |
| 12. Public-Key | Certificate Authority's 15 publicly available encryption key. This key is registered with the CA 15. |
| 13. Digital-Signature | Certificate Authority's 15 electronic identification using a public key system. |
| 15. Public-Key-Encryption-Version | Version of the Public Key Infrastructure (PKI) that is used by the CA 15. |

Merchant Registration/Response with/from the ISP—41(*a*) and 41(*b*)

Table 7(a) describes the general contents of the merchant's 13 registration request 41(*a*) with his ISP 11. The goal of this request is to establish a notarized certificate (i.e. a credential) 41(*b*) with the merchant's 13 relevant Internet 12 connectivity information that can be used in an electronic transaction in the electronic commerce system 100.

TABLE 7(a)

| Merchant - ISP Registration-Request Attribute | Definition |
|---|---|
| 1. Merchant-Name | Merchant's 13 business name. |
| 2. Primary-Phone-Number | Merchant's primary business telephone number. This is the number from where the merchant 13 usually logs onto the Internet 12. This is equivalent to the Calling-Station-Id in Table 2. |
| 3. Alternate-Phone-Number[s] | Alternate telephone numbers to the merchant's 13 Primary-Phone-Number. Businesses usually have more than one phone number. This is equivalent to the Alternate-Calling-Station-Id in Table 3. |

TABLE 7(a)-continued

| Merchant - ISP Registration-Request Attribute | Definition |
|---|---|
| 4. Email-Address | Merchant 13 electronic mail address. |
| 5. Certificate-Authority-Name | Merchant 13 certificate authority 15 name. This is included in the case of multiple CAs 15 being used in the commercial transaction. |
| 6. Public-Key | The merchant's 13 publicly available encryption key. This key is registered with the CA 15. |
| 7. Digital-Signature | Merchant's 13 electronic identification using a public key system. |
| 8. Public-Key-Encryption-Version | Version of the Public Key Infrastructure (PKI) that is used by the merchant 13. |

Table 7(b) describes the general contents of the merchant's 13 registration response 41(*b*) (i.e. the credential) from his ISP 11.

TABLE 7(b)

| Merchant - ISP Registration-Response Attribute | Definition |
|---|---|
| 1. Merchant-Name | Merchant's 13 business name. |
| 2. Email-Address | Merchant 13 electronic mail address. |
| 3. Certificate-Authority-Name | Merchant 13 certificate authority 15 name. This is included in the case of multiple CAs 15 being used in the commercial transaction. |
| 4. ISP-Information | Merchant's Internet Service Provider's 11 name, IP address, DNS name, etc. |
| 5. ISP-Certificate-Authority-Name | Merchant's ISP certificate authority 15 name. This is included in the case of multiple CAs 15 being used in the commercial transaction. |
| 6. Encrypted-ISP-Certificate-Authority-Information | RADIUS 18 merchant's unique logon User-Name, AVS 20 server IP address encrypted with the certificate authority 15's public key. This data is used during AVS. |
| 7. Encrypted-ISP-Merchant-Information | RADIUS 18 merchant's logon User-Name, Calling-Station-Id and Alternate-Calling-Station-Ids encrypted with the ISP 11's public key. See Table 2 for more detail on these RADIUS 18 attributes. |
| 8. Certificate-Issue-Date | Date on which the ISP 11 issued the customer's digital certificate 41(b), i.e. the certificate containing this table's information (Table 7(b)). |
| 9. Certificate-Expiration-Date | Date on which the ISP 11 expires the customer's digital certificate 41(b), i.e. the certificate containing this table's information (Table 7(b)). |
| 10. Public-Key | The merchant's ISP's publicly available encryption key. This key is registered with the CA 15. |
| 11. Digital-Signature | Merchant's ISP's electronic identification using a public key system. |
| 12. Public-Key-Encryption-Version | Version of the Public Key Infrastructure (PKI) that is used by the merchant's ISP 11. |

Merchant Registration/Response with/from the Certificate Authority—26(*a*) and 26(*b*)

Table 8(a) describes the general contents of the merchant's 13 registration request 26(*a*) to the trusted third party, the Certificate Authority 15. The goal of this request is to establish a notarized certificate (i.e. a credential) 26(*b*) with the merchant's 13 relevant business information that can be used in an electronic transaction in the electronic commerce system 100.

TABLE 8(a)

| Merchant - Certificate Authority Registration-Request Attribute | Definition |
|---|---|
| 1. Merchant-Name | Merchant's 13 business name. |
| 2. Billing-Address | Street address to which the commerce parties mail the merchant's correspondence. |
| 3. Alternate-Billing-Address[es] | Alternate street address[es] to the primary Billing-Address. |
| 4. Primary-Phone-Number | Merchant's primary business telephone number. This is the number from where the merchant 13 usually logs onto the Internet 12. This is equivalent to the Calling-Station-Id in Table 2. |
| 5. Alternate-Phone-Number[s] | Alternate telephone numbers to the merchant's 13 Primary-Phone-Number. Businesses usually have more than one phone number. This is equivalent to the Alternate-Calling-Station-Id in Table 3. |
| 6. Email-Address | Merchant's 13 electronic mail address. |
| 7. Alternate-Email-Address[es] | Merchant's 13 alternate electronic mail addresses[es]. |
| 8. ISP-Information | Merchant's Internet Service Provider's 11 name, IP address, DNS name, etc. |
| 9. ISP-Certificate-Authority-Name | Merchant's ISP certificate authority 15 name. This is included in the case of multiple CAs 15 being used in the commercial transaction. |
| 10. Encrypted-ISP-Certificate-Authority-Information. | RADIUS 18 merchant's unique logon User-Name, AVS 20 server IP address encrypted with the certificate authority 15's public key. This data is used during AVS. |
| 11. Encrypted-ISP-Merchant-Information | RADIUS 18 merchant's logon User-Name, Calling-Station-Id and Alternate-Calling-Station-Ids encrypted with the ISP 11's public key. See Table 2 for more detail on these RADIUS 18 attributes. |
| 12. Encrypted-Merchant-Bank-Information | Merchant's 13 bank account number and other relevant banking data. This information is encrypted using the merchant bank's 14 public key. |
| 13. Merchant-Bank-Name | Merchant bank's 14 business name, which is linked to the Encrypted-Merchant-Bank-Information. |
| 14. Alternate-Merchant-Bank-Name[s] | Merchant's 13 alternate banks to its primary merchant bank 14. |
| 15. Alternate-Encrypted-Merchant-Bank-Information | A merchant 13 may have more than one merchant bank 14. If this is so, then there will be multiple Alternate Encrypted-Merchant-Bank-Information records, each encrypted and explicitly linked to a specific Alternate-Merchant-Bank-Name record. |
| 16. Public-Key | The merchant's 13 publicly available encryption key. This key is registered with the CA 15. |
| 17. Digital-Signature | Merchant's 13 electronic identification using a public key system. |
| 18. Public-Key-Encryption-Version | Version of the Public Key Infrastructure (PKI) that is used by the merchant 13. |

Table 8(b) describes the general contents of the merchant's 13 registration response 26(*b*) (i.e. the credential) from the trusted third party, the Certificate Authority 15.

TABLE 8(b)

| Merchant - Certificate Authority Registration-Response Attribute | Definition |
|---|---|
| 1. Merchant-Name | Merchant's 13 business name. |
| 2. Billing-Address | Street address to which the merchant bank 14 mails the merchant's 13 banking statements. |
| 3. Alternate-Billing-Address[es] | Alternate street address[es] to the merchant's primary Billing-Address. |

TABLE 8(b)-continued

| Merchant - Certificate Authority Registration-Response Attribute | Definition |
|---|---|
| 4. Primary-Phone-Number | Merchant's 13 primary business telephone number. This is the number from where the merchant 13 usually logs onto the Internet 12. This is equivalent to the Calling-Station-Id in Table 2. |
| 5. Alternate-Phone-Number[s] | Alternate telephone numbers to the merchant's 13 Primary-Phone-Number. Businesses usually have more than one phone number. This is equivalent to the Alternate-Calling-Station-Id in Table 3. |
| 6. Email-Address | Merchant's 13 electronic mail address. |
| 7. Certificate-Authority-Name | Merchant's certificate authority 15 name. This is included in the case of multiple CAs 15 being used in the commercial transaction. |
| 8. ISP-Information | Merchant's Internet Service Provider's 11 name, IP address, DNS name, etc. |
| 9. Certificate-Expiration-Date | Date on which the CA 15 expires the customer's digital certificate 26(b), i.e. the certificate containing this table's information (Table 8(b)). |
| 10. Merchant-Public-Key | The merchant's 13 publicly available encryption key. This key is registered with the CA 15. |
| 11. Public-Key | The CA's 15 publicly available encryption key. This key is registered with the CA 15. |
| 12. Digital-Signature | CA's 15 electronic identification using a public key system. |
| 13. Public-Key-Encryption-Version | Version of the Public Key Infrastructure (PKI) that is used by the CA 15. |

Merchant Registration/Response with/from the Merchant Bank—37(*a*) and 37(*b*)

Table 9(a) describes the general contents of the merchant's 13 registration request 37(*a*) to its bank, the Merchant Bank 14. The goal of this request is to establish a notarized certificate (i.e. a credential) 37(*b*) with the merchant's 13 relevant banking information that can be used in an electronic transaction in the electronic commerce system 100. In the case where a merchant 13 has multiple, i.e. alternate merchant banks, then the merchant will generate a registration request 37(*a*) with each merchant bank 14, that in turn will generate a unique response credential 37(*b*) and return it to the merchant 13. Note that it is feasible to have a central trusted clearing-house, e.g. the CA 15 that could register all requests with the merchant's various banks. The preferred embodiment does not implement the clearing-house concept, but n either does not rule out its use.

TABLE 9(a)

| Merchant - Merchant Bank Registration-Request Attribute | Definition |
|---|---|
| 1 Merchant-Name | Merchant's 13 business name. |
| 2. Billing-Address | Street address to which the merchant bank 14 mails the merchant's 13 banking statements. |
| 3. Alternate-Billing-Address[es] | Alternate street address to the merchant's primary Billing Address. |
| 4. Primary-Phone-Number | Merchant's 13 primary business telephone number. This is the number from where the merchant 13 usually logs onto the Internet 12. This is equivalent to the Calling-Station-Id in Table 2. |

TABLE 9(a)-continued

| Merchant - Merchant Bank Registration-Request Attribute | Definition |
|---|---|
| 5. Alternate-Phone-Number[s] | Alternate telephone number[s] to the merchant's 13 Primary-Phone-Number. Businesses usually have more than one phone number. This is equivalent to the Alternate-Calling-Station-Id in Table 3. |
| 6. Email-Address | Merchant's 13 electronic mail address. |
| 7. Alternate-Email-Address | Merchant's 13 alternate electronic mail addresses. |
| 8. Certificate-Authority-Name | Merchant 13 certificate authority 15 name. This is included in the case of multiple CAs 15 being used in the commercial transaction. |
| 9. ISP-Information | Merchant's Internet Service Provider's 11 name, IP address, DNS name, etc. |
| 10. Encrypted-Merchant-Bank-Information | Merchant's 13 bank account number and other relevant data. This information is encrypted using the merchant bank's 14 public key. |
| 11. Public-Key | The merchant's 13 publicly available encryption key. This key is registered with the CA 15. |
| 12. Digital-Signature | Merchant's 13 electronic identification using a public key system. |
| 13. Public-Key-Encryption-Version | Version of the Public Key Infrastructure (PKI) that is used by the merchant 13. |

Table 9(b) describes the general contents of the merchant's 13 registration response 37(b) (i.e. the credential) from its bank, the Merchant Bank 14. In the case where a merchant 13 has multiple, i.e. alternate merchant banks, then each bank will generate this credential 37(b) and return it to the merchant 13.

TABLE 9(b)

| Merchant - Merchant Bank Registration-Response Attribute | Definition |
|---|---|
| 1. Merchant-Name | Merchant's 13 business name. |
| 2. Billing-Address | Street address to which the merchant bank 14 mails the merchant's 13 banking statements. |
| 3. Primary-Phone-Number | Merchant's 13 primary business telephone number. This is the number from where the merchant 13 usually logs onto the Internet 12. This is equivalent to the Calling-Station-Id in Table 2. |
| 4. Email-Address | Merchant's 13 electronic mail address. |
| 5. Merchant-Bank-Name | Merchant bank's 14 business name. |
| 6. Encrypted-Merchant-Bank-Information | Merchant's 13 bank account number and other relevant data. This information is encrypted using the merchant bank's 14 public key. |
| 7. Certificate-Authority-Name | Merchant bank 14 certificate authority 15 name. This is included in the case of multiple CAs 15 being used in the commercial transaction. |
| 8. ISP-Information | Merchant bank's 14 Internet Service Provider's 11 name, IP address, DNS name, etc. |
| 9. Certificate-Issue-Date | Date on which the merchant bank 14 issued the customer's digital certificate 37(b), i.e. the certificate containing this table's information (Table 9(b)). |
| 10. Certificate-Expiration-Date | Date on which the merchant bank 14 expires the customer's digital certificate 37(b), i.e. the certificate containing this table's information (Table 9(b)). |
| 11. Public-Key | The merchant bank's 14 publicly available encryption key. This key is registered with the CA 15. |

TABLE 9(b)-continued

| Merchant - Merchant Bank Registration-Response Attribute | Definition |
|---|---|
| 12. Digital-Signature | Merchant bank's 14 electronic identification using a public key system. |
| 13. Public-Key-Encryption-Version | Version of the Public Key Infrastructure (PKI) that is used by the merchant bank 14. |

ISP Registration/Response with/from the Certificate Authority—25(a) and 25(b)

Table 10(a) describes the general contents of the ISP's 11 registration request 25(a) to the trusted third part, the Certificate Authority 15. The goal of this request is to establish a notarized certificate (i.e. a credential) 25(b) with the ISP's relevant Internet 12 connectivity information that can be used in an electronic transaction in the electronic commerce system 100.

TABLE 10(a)

| ISP - Certificate Authority Registration-Request Attribute | Definition |
|---|---|
| 1. ISP-Name | Each electronic commerce participant's 13, 14, 15, 19, and 29 Internet Service Provider's 11 name. |
| 2. Business-Address | Street address of the ISP 11. |
| 3. Alternate-Business-Address[es] | Alternate street address[es] of the ISP 11. Optional field. |
| 4. Primary-Phone-Number | ISP's 11 primary business telephone number. |
| 5. Alternate-Phone-Number[s] | Alternate business numbers to the ISP's 11 primary business telephone number. |
| 6. Email-Address | ISP's 11 electronic mail address. |
| 7. Alternate-Email-Address[es] | ISP's 11 alternate electronic mail address. |
| 8. Encrypted-ISP-RADIUS-Server-Information | IP address, DNS name and other information needed to communicate electronically with the ISP's RADIUS 18 server. This is encrypted with the public key of the Address Verification Service 20. |
| 9. Alternate-Encrypted-ISP-RADIUS-Server-Information | Alternate connection information in case the primary RADIUS 19 server is unavailable to the AVS 20. IP address, DNS name and other information needed to communicate electronically and securely with the RADIUS 18 server. This is encrypted with the public key of the Address Verification Service 20. |
| 10. Public-Key | The ISP's 11 publicly available encryption key. This key is registered with the CA 15. |
| 11. Digital-Signature | ISP's 11 electronic identification using a public key system. |
| 12. Public-Key-Encryption-Version | Version of the Public Key Infrastructure (PKI) that is used by the ISP 11. |

Table 10(b) describes the general contents of the ISP's 11 registration response 25(b) (i.e. the credential) from the trusted third part, the Certificate Authority 15.

Note that the RADIUS 18 data could be stored centrally in a database with the CA 15, rather than encrypting this information in the credential 25(b). The data would then be accessed via the relevant party's CA registered name, e.g. ISP-Name in Table 10(b), or Merchant-Name in Table 8(b), etc. There are a number of advantages to this approach including reducing the certificate 25(b) size, as well as the possibility of the certificate becoming corrupted on the CPE 16. The preferred embodiment does not implement this approach, but obviously does not rule out its use.

TABLE 10(b)

| ISP - Certificate Authority Registration- Response Attribute | Definition |
|---|---|
| 1. ISP-Name | Each electronic commerce participant's (13, 14, 15, 19, and 29) Internet Service Provider's 11 name. |
| 2. Business-Address | Street address of the ISP 11. |
| 3. Primary-Phone-Number | ISP's 11 primary business telephone number. |
| 4. Email-Address | ISP's 11 electronic mail address. |
| 5. Certificate-Authority-Name | ISP's certificate authority 15 name. This is included in the case of multiple CAs 15 being used in the commercial transaction. |
| 6. Encrypted-ISP-RADIUS-Server-Information | IP address, DNS name and other information needed to communicate electronically with the ISP's RADIUS 18 server. This is encrypted with the public key of the Address Verification Service 20. |
| 7. Alternate-Encrypted-ISP-RADIUS-Server-Information | Alternate connection information in case the primary RADIUS 19 server is unavailable to the AVS 20. IP address, DNS name and other information needed to communicate electronically and securely with the RADIUS 18 server. This is encrypted with the public key of the Address Verification Service 20. |
| 8. Certificate-Issue-Date | Date on which the CA 15 issued the ISP's digital certificate 25(b), i.e. the certificate containing this table's information (Table 10(b)). |
| 9. Certificate-Expiration-Date | Date on which the CA 15 expires the ISP's digital certificate 25(b), i.e. the certificate containing this table's information (Table 10(b)). |
| 10. Public-Key | The CA 15 publicly available encryption key. This key is registered with the CA 15. |
| 11. Digital-Signature | CA 15 electronic identification using a public key system. |
| 12. Public-Key-Encryption-Version | Version of the Public Key Infrastructure (PKI) that is used by the CA 15. |

Customer Issuer Bank Registration/Response with/from the Certificate Authority—30(a) and 30(b)

Table 11(a) describes the general contents of the Customer Issuer Bank's 29 registration request 30(a) to the trusted third part, the Certificate Authority 15. The goal of this request is to establish a notarized certificate (i.e. a credential) 30(b) with the customer issuer bank's 29 relevant business information that can be used in an electronic transaction in the electronic commerce system 100.

TABLE 11(a)

| Customer Issuer Bank - Certificate Authority Registration- Request Attribute | Definition |
|---|---|
| 1. Customer-Issuer-Bank-Name | Customer issuer bank's 29 business name. |
| 2. Business-Address | Street address of the customer issuer bank 29. |
| 3. Alternate-Business-Address[es] | Alternate street address[es] of the customer issuer bank 29. |
| 4. Primary-Phone-Number | Customer issuer banks' 29 primary business telephone number. This is the number from where the bank 29 usually logs onto the Internet 12. This is equivalent to the Calling-Station-Id in Table 2. |
| 5. Alternate-Phone-Number[s] | Alternate customer issuer banks' 29 primary business telephone number[s]. |
| 6. Email-Address | Customer issuer banks' 29 electronic mail address. |

TABLE 11(a)-continued

| Customer Issuer Bank - Certificate Authority Registration- Request Attribute | Definition |
|---|---|
| 7. Alternate-Email-Address[es] | Customer issuer banks' 29 alternate electronic mail address. |
| 8. ISP-Information | Customer issuer bank's 29 Internet Service Provider's 11 name, IP address, DNS name, etc. |
| 9. Alternate-ISP-Information | Alternate customer issuer bank's 29 Internet Service Provider's 11 name, IP address, DNS name, etc. |
| 10. Public-Key | The customer issuer bank's 29 publicly available encryption key. This key is registered with the CA 15. |
| 11. Digital-Signature | Customer issuer bank's 29 electronic identification using a public key system. |
| 12. Public-Key-Encryption-Version | Version of the Public Key Infrastructure (PKI) that is used by the customer issuer bank 29. |

Table 11(b) describes the general contents of the Customer Issuer Bank's 29 registration response 30(b) (i.e. the credential) from the trusted third part, the Certificate Authority 15.

TABLE 11(b)

| Customer Issuer Bank - Certificate Authority Registration- Response Attribute | Definition |
|---|---|
| 1. Customer-Issuer-Bank-Name | Customer issuer banks' 29 business name. |
| 2. Business-Address | Street address of the customer issuer bank 29. |
| 3. Primary-Phone-Number | Customer issuer banks' 29 primary business telephone number. This is the number from where the bank 29 usually logs onto the Internet 12. This is equivalent to the Calling-Station-Id in Table 2. |
| 4. Email-Address | Customer issuer banks' 29 electronic mail address. |
| 5. ISP-Information | Customer issuer bank's 29 Internet Service Provider's 11 name, IP address, DNS name, etc. |
| 6. Customer-Issuer-Bank-Public-Key | The customer issuer bank's 29 publicly available encryption key. This key is registered with the CA 15. |
| 7. Certificate-Issue-Date | Date on which the CA 15 issued the customer issuer bank's digital certificate 30(b), i.e. the credential containing this table's information (Table 11(b)). |
| 8. Certificate-Expiration-Date | Date on which the CA 15 expires the customer issuer bank's digital certificate 30(b), i.e. the credential containing this table's information (Table 11(b)). |
| 9. Public-Key | The CA 15 publicly available encryption key. This key is registered with the CA 15. |
| 10. Digital-Signature | CA's 15 electronic identification using a public key system. |
| 11. Public-Key-Encryption-Version | Version of the Public Key Infrastructure (PKI) that is used by the CA 15. |

Merchant Bank Registration/Response with/from the Certificate Authority—27(a) and 27(b)

Table 12(a) describes the general contents of the Merchant Bank's 14 registration request 27(a) to the trusted third part, the Certificate Authority 15. The goal of this request is to establish a notarized certificate (i.e. a credential) 27(b) with the merchant bank's 14 relevant business information that can be used in an electronic transaction in the electronic commerce system 100.

TABLE 12(a)

| Merchant Bank - Certificate Authority Registration-Request Attribute | Definition |
| --- | --- |
| 1. Merchant-Bank-Name | Merchant bank's 14 business name. |
| 2. Business-Address | Street address of the merchant bank 14. |
| 3. Alternate-Billing-Address[es] | Alternate street address[es] of the merchant bank 14. |
| 4. Primary-Phone-Number | Merchant bank's 14 primary telephone number. This is the number from where the bank 14 usually logs onto the Internet 12. This is equivalent to the Calling-Station-Id in Table 2. |
| 5. Alternate-Phone-Number[s] | Alternate telephone number[s] to the merchant bank's 14 Primary-Phone-Number. |
| 6. Email-Address | Merchant bank's 14 contact email address at bank for online commerce transactions |
| 7. Alternate-Email-Address[es] | Merchant bank's 14 alternate contact email address[es] for online commerce transactions. |
| 8. ISP-Information | Merchant banks' ISP 11 name, IP address, DNS name, etc. |
| 9. Alternate-ISP-Information | Merchant banks' alternate ISP 11 name[s], IP address[es], DNS name[s], etc. |
| 10. Public-Key | The merchant bank's 14 publicly available encryption key. This key is registered with the CA 15. |
| 11. Digital-Signature | Merchant bank's 14 electronic identification using a public key infrastructure system. |
| 12. Public-Key-Encryption-Version | Version of the Public Key Infrastructure (PKI) that is used by the merchant bank 14. |

Table 12(b) describes the general contents of the Merchant Bank's 14 registration response 27(b) (i.e. the credential) from the trusted third part, the Certificate Authority 15.

TABLE 12(b)

| Merchant Bank - Certificate Authority Registration-Response Attribute | Definition |
| --- | --- |
| 1. Merchant-Bank-Name | Merchant bank's 14 business name. |
| 2. Business-Address | Street address of the merchant bank 14. |
| 3. Primary-Phone-Number | Merchant bank's 14 primary telephone number. |
| 4. Email-Address | Merchant bank's 14 contact email address at bank for online commerce transactions |
| 5. Merchant-Bank-Public-Key | The merchant bank's 14 publicly available encryption key. This key is registered with the CA 15. |
| 6. ISP-Information | Merchant bank's ISP 11 name, IP address, DNS name, etc. |
| 7. Encrypted-Merchant-CA-Information | Merchant's 13 pertinent certificate authority 15 information, e.g. merchant's ISP information, etc. This information is encrypted using the CA's 15 public key. |
| 8. Certificate-Issue-Date | Date on which CA 15 issued the merchant bank's digital certificate 27(b), i.e. the certificate containing this table's information (Table 12(b)). |
| 9. Certificate-Expiration-Date | Date on which the CA 15 expires the merchant bank's digital certificate 27(b), i.e. the certificate containing this table's information (Table 12(b)). |
| 10. Public-Key | The CA's 15 publicly available encryption key. This key is registered with the CA 15. |
| 11. Digital-Signature | CA's 15 electronic identification using a public key system. |
| 12. Public-Key-Encryption-Version | Version of the Public Key Infrastructure (PKI) that is used by the CA 15. |

Transaction Process

FIG. 4 illustrates the transaction process of the electronic commerce system 100, i.e. when a customer 19 (i.e. originating participant) purchases something from a merchant 13 (i.e. recipient participant). This process cannot take place unless all participants in the electronic commerce system 100, as described previously, have fulfilled the registration process. Furthermore this process depends on that all parties are appropriately logged onto the Internet 12 via their relevant ISP 11.

The customer 19 accesses the merchant's merchandise database, usually by means of the merchant's 13 web site. This is known today as e-commerce. An example of one such well known merchant web site is Amazon.com. Commercial products are available today that implement the complete e-commerce service including a system from ICVerify called CashRegister (www.icverify.com/cashregister). The current invention preferably would be integrated with existing e-commerce products, such as CashRegister.

Before the customer 19 has selected the merchandise or services that he wants to purchase, the merchant's web site usually creates an electronic "shopping cart" for the customer 19. As the customer 19 selects merchandise, the web site stores these selections in the electronic shopping cart. The customer 19 can then pay for the goods that are in the "shopping cart". When accessing the merchant's web site, the customer is sent the merchant's 13 digital certificate. The merchant's certificate is the one that the merchant 13 received from the certificate authority 15, i.e. 24(b) in FIG. 3 and described in Table 8(b). Hence the customer 19 can verify that the merchant 13 is an authenticated entity by checking the certificate authority's 15 digital signature on the merchant's certificate 24(b) and/or by requesting address verification service 20 from the customer's CA 15.

The merchant 13 web site provides an electronic form for the customer 19 to fill in regarding the customer's payment method, e.g. credit card information. This is usually done using SSL. This step in the purchase process will simply allow the customer 19 to select an appropriate credit card certificate from his digital wallet and attach it to the merchant's payment form. In FIG. 4 the arrows 20(a) and 20(b) depict this. The customer's credit card certificate is shown as 36(b) in FIG. 3, the Registration Process and is defined in Table 5(b). As mentioned previously the customer's confidential credit card information is encrypted with the customer issuer bank's 29 public key, hence enabling only the customer issuer bank 29 to decrypt and read the confidential credit card information by using the bank's private key. The customer's credit card certificate 36(b) is attached to the customer's purchase order 20(a) (known as the commerce document in the SET '677 patent) and encrypted with the merchant's 13 public key. The merchant's 13 public key is made available to the customer 19 during the electronic commerce transaction by providing the customer 19 with a payment form, i.e. via certificate 26(b) as described in Table 8(b).

Once the merchant 13 receives the customer's payment form via 20(a) and 34(b) (known as the commerce instrument in the SET '677 patent), he (i.e. the merchant's computing device) decrypts the appropriate information, e.g. the customer's Primary-Shipping-Address and merchandise requested information. The merchant 19 then forwards the customer's credit card certificate 36(b) to the certificate authority 15 for address verification service 20. Other parties could execute AVS 20 in the electronic commerce system 100, e.g. the merchant bank 13, or the customer issuer bank 29. The invention's preferred embodiment lays the activation of the AVS 20 task on the merchant 13, but any of the other parties could as easily undertake it. The arrow 21(a) in FIG. 4 depicts the merchant 13 AVS 20 process request. An example alternative is depicted by arrows 22(a) and 22(b), i.e. address verification request and response originating from the merchant bank 29. As can be seen in FIG. 4, the merchant 13 contacts the certificate authority 15 by transmitting the customer's credit card certificate 36(b) via AVS request 21(b).

The CA 15 then forwards the merchant's request to the customer's ISP 11 for AVS 20 via 55 in FIG. 4. The customer's ISP 11 information is retrieved from the customer's ISP 11 digital certificate, i.e. 40(b) from FIG. 3 as described in Table 4(b). The customer's ISP 11 then verifies using the RADIUS 18 server that the customer 19 is currently logged onto the Internet 12 using either the customer's certificate's 40(b) customer's Primary-Phone-Number or the customer's Alternate-Phone-Number[s]. If the RADIUS 18 database has a phone number, i.e. the Calling-Station-Id (see Table 2) that differs from the above mentioned customer's phone numbers, or that the customer 19 is not logged onto the Internet 12 (i.e. the Acct-Terminate-Cause RADIUS 18 attribute is set), then the ISP 11 will respond 21(b) to the merchant 13 that the customer's address verification failed. This information is relayed back to the merchant via 21(b). At this stage, the merchant 13 has a choice, (a) either he can accept the customer's purchase request 20(a) even though address verification failed, or (b) he can reject the customer's request 20(a) by returning a negative purchase confirmation to the customer 19, i.e. via merchant confirmation process 34(a) and 20(b). At this point, the ISP 11 could contact the customer 19 and challenge the customer for the previously mentioned pass phrase (see Encrypted-ISP-Pass-Phrase in Table 4(a)), if the merchant 13 requests this additional verification via the CA 15.

On the other hand, if the AVS 20 was positive, i.e. a valid address was verified, the merchant 13 forwards the customer's credit card certificate (i.e. 36(b) in FIG. 3) together with the customer 19 payment amount to his bank, the merchant bank 14. The arrow 35(a) in FIG. 4 depicts this.

This is the start of the existing MOTO credit card payment system that merchants use today in a MOTO transaction. The merchant bank 14 uses the existing credit card network 28 to contact the customer issuer bank 29. This authorization request is then validated provided that the customer 19 has sufficient funds or credit in his account. This authorization request is depicted by arrows 35(a), 32(a) 33(a) in FIG. 4 and the authorization response is depicted by arrows 33(b), 32(b) and 35(b) in FIG. 4. The merchant 13 then sends a positive confirmation to the customer 19 via 34(a) and 20(b). The merchant's customer purchase confirmation could be via a web form and/or via email. Amazon.com for example uses both a web form and an email to confirm the purchase, as well as when the purchased goods were shipped to the customer 19. Alternatively this could be in the form of a phone call and/or a fax. The invention's preferred embodiment uses the web form and email combination for the merchant's customer purchase confirmation.

As is usually the case in MOTO credit card transactions, at the close of the merchant's business day, the merchant 13 requests payment for all approved payments that goods have been shipped for. This payment information is sent to the merchant bank 14 via request 35(a). The merchant bank 14 then enters the request into the current clearance and settlement system that is used by banks today. The merchant bank 14 pays the merchant 13 by crediting his bank account. The merchant bank 14 then settles its account with the customer issuer bank 29. After settling with the merchant bank 14 the customer issuer bank 29 sends the customer 19 a bill 31(a) and the customer 19 usually pays 31(b) his issuer bank 29.

What is claimed:

1. In an electronic commerce transaction involving at least one commerce document defining the transaction and at least one commerce instrument defining a payment for the transactions comprising a computing device for:

a) encrypting the commerce document and the commerce instrument at an originating participant;

b) sending the encrypted commerce document and the encrypted commerce instrument from the originating participant to a recipient participant over an electronic commerce network;

c) enabling the recipient participant to decrypt one of the commerce document or the commerce instrument;

d) preventing the recipient participant from decrypting the other of the commerce document or the commerce instrument;

e) accessing said electronic commerce network by a first participant at a first called network access number by means of a first computing device;

f) accessing said electronic commerce network by said first participant from a first calling network access number by means of said first computing device;

g) accessing said electronic commerce network by a second participant at a second called network access number by means of a second computing device;

h) accessing said electronic commerce network by said second participant from a second calling network access number by means of said second computing device;

i) providing network access authentication means by a third participant for said first participant and said second participant by means of a third computing device comprising the steps of:

i.) connecting to said first called network access number from said first calling network access number by said first participant;

ii.) validating said first participant's name, said first called network access number and said first calling network access number by said third participant;

iii.) encrypting said first network access authentication information in a first authentication document by said third participant;

iv.) sending said first authentication document to said first participant by said third participant over said electronic commerce network;

v.) connecting to said second called network access number from said second calling network access number by said second participant;

vi.) validating said second called network access number and said second calling network access number by said third participant;

vii.) encrypting said second network access authentication information in a second authentication document by said third participant; and viii.) sending said second authentication document to said second participant by said third participant over said electronic commerce network.

2. A method as recited in claim 1 wherein said network authentication means includes the steps of:

a) pre-populating a first electronic storage means with a first network access authentication information for said first participant, said third participant controlling said first electronic storage means; and b) pre-populating said first electronic storage means with a second network access authentication information for said second participant, said third participant controlling said first electronic storage means.

3. A method as recited in claim 2 wherein said first network access authentication information comprising:

a name, said first called network access number, said first calling network access number, an shipping address, and other data;

and wherein said second network access authentication information comprising;

a name, said second called network access number, said second calling network access number, a billing address, and other data.

4. A method as recited in claim 3, further comprising the steps of:

a) initiating an electronic commerce transaction by said first participant with said second participant;

b) sending said first authentication document by said first participant to said second participant in said electronic commerce transaction over said electronic commerce network;

c) validating said first authentication document by said second participant by sending said first authentication document to said third participant and sending a first response to said second participant by said third participant over said electronic commerce network;

d) sending said second authentication document by said second participant to said first participant in said electronic commerce transaction over said electronic commerce network; and e) validating said second authentication document by said first participant by sending said second authentication document to said third participant and sending a second response to said first participant by said third participant over said electronic commerce network.

5. A method as recited in claim 4 further comprising the steps by said third participant of:

a) extracting and decrypting said first called network access number from said first authentication document;

b) validating said first called network access number from said first authentication document with said first called network access number stored in said first electronic storage means;

c) extracting and decrypting said first calling network access number from said first authentication document;

d) validating said first calling network access number from said first authentication document with said first calling network access number stored in said first electronic storage means;

e) sending said first response to said second participant over said electronic commerce network.

6. A method as recited in claim 5 further comprising the steps by said third participant of:

a) extracting and decrypting said second called network access number from said second authentication document;

b) validating said second called network access number from said second authentication document with said second called network access number stored in said first electronic storage means;

c) extracting and decrypting said second calling network access number from said second authentication document;

d) validating said second calling network access number from said second authentication document with said second calling network access number stored in said first electronic storage means;

e) sending said second response to said first participant over said electronic commerce network.

7. A method as recited in claim 6, wherein said first electronic storage means comprises a RADIUS database.

8. A method as recited in claim 1, wherein the accessing step comprises the step of connecting to a communications system selected from the group comprising a cable TV network, a satellite network, a public switched telephone network, a mobile phone network, a RF network and the Internet.

9. A method as recited in claim 1, wherein said computing device selected from the group comprising a computer, a personal computer, a web enabled TV, a web enabled wire-line phone, a personal digital assistant and a web enabled mobile phone.

10. In an electronic commerce transaction involving at least one commerce document defining the transaction and at least one commerce instrument defining a payment for the transaction comprising: a computing device for:

a) encrypting the commerce document and the commerce instrument at an originating participant;

b) sending the encrypted commerce document and the encrypted commerce instrument from the originating participant to a recipient participant over an electronic commerce network;

c) enabling the recipient participant to decrypt one of the commerce document or the commerce instrument;

d) preventing the recipient participant from decrypting the other of the commerce document or the commerce instrument;

e) accessing said electronic commerce network by a first participant at a first alternate called network access number by means of a first computing device;

f) accessing said electronic commerce network by said first participant from a first alternate calling network access number by means of said first computing device;

g) accessing said electronic commerce network by a second participant at a second alternate called network access number by means of a second computing device;

h) accessing said electronic commerce network by said second participant from a second alternate calling network access number by means of said second computing device;

i) providing network access authentication means by a third participant for said first participant and said second participant by means of a third computing device comprising the steps of:

i.) connecting to said first alternate called network access number from said first alternate calling network access number by said first participant;

ii.) validating said first participant's name, said first alternate called network access number and said first alternate calling network access number by said third participant;

iii.) encrypting said first said network access authentication information in a first authentication document by said third participant;

iv.) sending said first authentication document to said first participant by said third participant over said electronic commerce network;

v.) connecting to said second called network access number from said second alternate calling network access number by said second participant;

vi.) validating said second alternate called network access number and said second alternate calling network access number by said third participant;

vii.) encrypting said second network access authentication information in a second authentication document by said third participant; and viii.) sending said second authentication document to said second participant by said third participant over said electronic commerce network.

11. A method as recited in claim 10 wherein said network authentication means includes the steps of:

a) pre-populating a first electronic storage means with a first alternate network access authentication information for said first participant, said third participant controlling said first electronic storage means; and b) pre-populating said first electronic storage means with a second alternate network access authentication information for said second participant, said third participant controlling said first electronic storage means.

12. A method as recited in claim 11 wherein said first alternate network access authentication information comprising:

a name, said first alternate called network access number, said first alternate calling network access number, an alternate shipping address, and other data;

and said second network access authentication information comprising;

a name, said second alternate called network access number, said second alternate calling network access number, a billing address, and other data.

13. A method as recited in claim 12, further comprising the steps of:

a) initiating an electronic commerce transaction by said first participant with said second participant;

b) sending said first authentication document by said first participant to said second participant in said electronic commerce transaction over said electronic commerce network;

c) validating said first authentication document by said second participant by sending said first authentication document to said third participant and sending a first response to said second participant by said third participant over said electronic commerce network;

d) sending said second authentication document by said second participant to said first participant in said electronic commerce transaction over said electronic commerce network; and e) validating said second authentication document by said first participant by sending said second authentication document to said third participant and sending a second response to said first participant by said third participant over said electronic commerce network.

14. A method as recited in claim 13 further comprising the steps by said third participant of:

a) extracting and decrypting said first alternate called network access number from said first authentication document;

b) validating said first alternate called network access number from said first authentication document with said first alternate called network access number stored in said first electronic storage means;

c) extracting and decrypting said first alternate calling network access number from said first authentication document;

d) validating said first alternate calling network access number from said first authentication document with said first alternate calling network access number stored in said first electronic storage means; and e) sending said first response to said second participant over said electronic commerce transaction network over said electronic commerce network.

15. A method as recited in claim 13 further comprising the steps by said third participant of;

a) extracting and decrypting said second alternate called network access number from said second authentication document;

b) validating said second alternate called network access number from said second authentication document with said second alternate called network access number stored in said first electronic storage means;

c) extracting and decrypting said second alternate calling network access number from said second authentication document;

d) validating said second alternate calling network access number from said second authentication document with said second alternate calling network access number stored in said first electronic storage means;

e) sending said second response to said first participant over said electronic commerce transaction network over said electronic commerce network.

16. A method as recited in claim 15 wherein said first electronic storage means comprises a RADIUS database.

17. A method as recited in claim 10, wherein the accessing step comprises the step of connecting to a communications system selected from the group comprising a cable TV network, a satellite network, a public switched telephone network, a mobile phone network, a RF network and the Internet.

18. A method as recited in claim 10, wherein said computing device selected from the group comprising a computer, a personal computer, a web enabled TV, a web enabled wire-line phone, a personal digital assistant and a web enabled mobile phone.

* * * * *